(12) United States Patent
Morita et al.

(10) Patent No.: US 11,999,235 B2
(45) Date of Patent: Jun. 4, 2024

(54) VEHICLE DRIVE DEVICE

(71) Applicant: AISIN CORPORATION, Aichi (JP)

(72) Inventors: Keishi Morita, Kariya (JP); Hiroshi Ishiyama, Kariya (JP)

(73) Assignee: AISIN CORPORATION, Kariya (JP)

( * ) Notice: Subject to any disclaimer, the term of this patent is extended or adjusted under 35 U.S.C. 154(b) by 250 days.

(21) Appl. No.: 17/618,528

(22) PCT Filed: Sep. 27, 2019

(86) PCT No.: PCT/JP2019/038286
§ 371 (c)(1),
(2) Date: Dec. 13, 2021

(87) PCT Pub. No.: WO2021/059511
PCT Pub. Date: Apr. 1, 2021

(65) Prior Publication Data
US 2022/0242216 A1    Aug. 4, 2022

(51) Int. Cl.
*B60K 6/22*     (2007.10)
*B60K 6/26*     (2007.10)
*B60K 6/387*     (2007.10)
*B60K 6/405*     (2007.10)
*B60K 6/48*     (2007.10)
(Continued)

(52) U.S. Cl.
CPC .............. *B60K 6/26* (2013.01); *B60K 6/387* (2013.01); *B60K 6/405* (2013.01); *B60K 6/48* (2013.01); *B60K 6/54* (2013.01); *H02K 11/20* (2016.01)

(58) Field of Classification Search
CPC ............................................... B60K 6/00–547
See application file for complete search history.

(56) References Cited

U.S. PATENT DOCUMENTS

| | | | | |
|---|---|---|---|---|
| 6,382,335 | B2 * | 5/2002 | Takashima | B60L 50/61 |
| | | | | 701/107 |
| 8,536,743 | B2 * | 9/2013 | Kasuya | B60L 50/16 |
| | | | | 310/58 |

(Continued)

FOREIGN PATENT DOCUMENTS

| | | |
|---|---|---|
| JP | 2001-090817 A | 4/2001 |
| JP | 2015-155292 A | 8/2015 |

(Continued)

*Primary Examiner* — Erez Gurari
(74) *Attorney, Agent, or Firm* — Oliff PLC

(57) ABSTRACT

A rotor support member includes: a tubular portion having a tubular shape extending along an axial direction and supporting a rotor of a rotary electric machine; and a flange portion provided to extend along a radial direction on an inner side in radial direction with respect to tubular portion at a position adjacent to a first engagement device on a first side in the axial direction, and connected to tubular portion. The flange portion includes a cylinder forming portion protruding to first side in the axial direction so as to form a cylinder portion on which a first piston portion of the first engagement device slides. A rotation sensor includes a rotating body supported by an outer peripheral surface of cylinder forming portion on an outer side in the radial direction, and a fixed body disposed on the outer side in the radial direction with respect to the rotating body.

20 Claims, 4 Drawing Sheets

(51) Int. Cl.
*B60K 6/54* (2007.10)
*H02K 11/20* (2016.01)

(56) References Cited

U.S. PATENT DOCUMENTS

| | | | | |
|---|---|---|---|---|
| 8,761,982 B2 * | 6/2014 | Yamamoto | ............... | B60K 6/52 |
| | | | | 903/903 |
| 8,808,128 B2 * | 8/2014 | Sada | ................ | B60K 6/40 |
| | | | | 475/5 |
| 8,836,181 B2 * | 9/2014 | Iwase | ................ | B60L 50/16 |
| | | | | 310/67 R |
| 8,836,187 B2 * | 9/2014 | Iwase | ................ | B60L 50/61 |
| | | | | 310/78 |
| 8,845,484 B2 * | 9/2014 | Kamiya | ............... | F16D 48/02 |
| | | | | 192/3.3 |
| 8,905,881 B2 * | 12/2014 | Sada | ................ | B60K 6/445 |
| | | | | 475/5 |
| 8,997,956 B2 * | 4/2015 | Iwase | ................ | F16H 45/02 |
| | | | | 192/3.3 |
| 9,108,622 B2 * | 8/2015 | Matsuo | ............... | B60W 10/06 |
| 9,266,419 B2 * | 2/2016 | Iwase | ................ | B60K 6/547 |
| 9,677,646 B2 | 6/2017 | Kasuya et al. | | |
| 11,104,216 B2 | 8/2021 | Tada et al. | | |
| 11,254,200 B2 * | 2/2022 | Omote | ............... | H02K 7/108 |
| 11,407,301 B2 * | 8/2022 | Kato | ............... | F16H 57/0401 |
| 11,581,842 B2 * | 2/2023 | Seo | ................ | H02P 29/67 |
| 11,745,577 B2 * | 9/2023 | Matsuoka | ............ | H02K 21/22 |
| | | | | 60/341 |
| 2006/0097670 A1 * | 5/2006 | Fukasaku | ............ | B60K 6/52 |
| | | | | 318/105 |
| 2012/0080248 A1 * | 4/2012 | Kasuya | ............... | H02K 9/19 |
| | | | | 903/902 |
| 2012/0080286 A1 * | 4/2012 | Kasuya | ............... | B60K 6/48 |
| | | | | 192/113.3 |
| 2012/0318630 A1 * | 12/2012 | Iwase | ................ | B60L 50/16 |
| | | | | 192/85.01 |
| 2012/0319514 A1 * | 12/2012 | Iwase | ................ | B60L 50/16 |
| | | | | 310/78 |
| 2016/0245373 A1 | 8/2016 | Kasuya et al. | | |
| 2018/0313411 A1 | 11/2018 | Satoyoshi et al. | | |
| 2019/0351752 A1 | 11/2019 | Tada et al. | | |
| 2022/0063596 A1 * | 3/2022 | Nishiu | ............... | F16D 48/02 |
| 2022/0242216 A1 * | 8/2022 | Morita | ............... | H02K 11/20 |
| 2023/0150349 A1 * | 5/2023 | Esaki | ................ | B60K 6/40 |
| | | | | 180/65.25 |
| 2023/0311672 A1 * | 10/2023 | Ebisumoto | ............ | B60K 6/48 |
| | | | | 701/22 |

FOREIGN PATENT DOCUMENTS

| | | |
|---|---|---|
| JP | 2018-184137 A | 11/2018 |
| WO | 2017/057190 A1 | 4/2017 |
| WO | 2018/181352 A1 | 10/2018 |

* cited by examiner

VEHICLE DRIVE DEVICE

TECHNICAL FIELD

The present disclosure relates to a vehicle drive device. The vehicle drive device includes: a rotary electric machine including a stator and a rotor disposed on the inner side in the radial direction with respect to the stator and functioning as a driving force source for wheels; a rotor support member that supports the rotor; a rotation sensor that detects rotation of the rotor; and a first engagement device disposed on the inner side in the radial direction with respect to the rotor.

BACKGROUND ART

An example of such a vehicle drive device is disclosed in Patent Documents 1 and 2 below. Hereinafter, in the description of the background art, reference numerals in the referenced patent document are used in parentheses.

In the vehicle drive device (100) of Patent Document 1, the first engagement device (4), the second engagement device (5), and the rotation sensor (37) are arranged side by side in the axial direction. Therefore, the vehicle drive device (100) tends to be large in the axial direction.

In contrast, in the vehicle drive device (1) of Patent Document 2, the rotation sensor (18) overlaps with part of the second engagement device (CL2) as seen in a radial direction along the radial direction (R), so that the dimension of the vehicle drive device (1) in the axial direction (L) is reduced. Specifically, in the vehicle drive device (1) of Patent Document 2, the outer support member (71) that supports the friction member (61) of the second engagement device (CL2) from the outer side (R2) in the radial direction (R) is spline-engaged with the tubular portion (31) of the rotor support member (30). The outer support member (71) is provided to extend along the radial direction (R), and includes a flange portion (73) provided on one side (L1) in the axial direction (L) with respect to the second engagement device (CL2) and adjacent to the second engagement device (CL2). The flange portion (73) includes a cylinder forming portion protruding to the one side (L1) in the axial direction (L) so as to form a cylinder portion on which the piston portion (77) of the second engagement device (CL2) slides. The rotation sensor (18) is disposed on the outer side (R2) in the radial direction (R) with respect to the cylinder forming portion so as to overlap with the cylinder forming portion as seen in a radial direction along the radial direction (R).

As described above, in the vehicle drive device (1) of Patent Document 2, the rotation sensor (18) is installed using the space on the outer side (R2) in the radial direction (R) with respect to the cylinder forming portion, so that the increase in dimension in the axial direction (L) of the vehicle drive device (1) is suppressed.

RELATED ART DOCUMENTS

Patent Documents

Patent Document 1: Japanese Unexamined Patent Application Publication No. 2018-184137 (JP 2018-184137 A) (FIG. 2)
Patent Document 2: WO 2017/057190 (FIG. 3)

SUMMARY OF THE DISCLOSURE

Problem to be Solved by the Invention

In the vehicle drive device (1) of Patent Document 2, the rotating body (97) is disposed on the outer side (R2) in the radial direction (R) with respect to the fixed body (96) of the rotation sensor (18). The rotating body (97) is supported by the rotating body support member (98) integrally connected to the tubular portion (31) of the rotor support member (30) by welding or the like. Thus, in the vehicle drive device (1) of Patent Document 2, it is necessary to separately provide the rotating body support member (98) for supporting the rotating body (97). Therefore, there is an issue that the number of components of the vehicle drive device (1) accordingly increases and the manufacturing cost of the vehicle drive device (1) increases.

On the other hand, the fixed body (96) is supported by the protruding portion (27) provided in the case (2) so as to protrude in the axial direction (L). That is, the fixed body (96) is fixed at a fixed position. Here, as described above, the outer support member (71) is spline-engaged with the tubular portion (31) of the rotor support member (30), so the outer support member (71) rotates integrally with the rotor support member (30). Therefore, it is necessary to provide a clearance in the radial direction (R) between the fixed body (96) supported by the protruding portion (27) and the cylinder forming portion of the outer support member (71) to avoid interference therebetween. Thus, in the vehicle drive device (1) of Patent Document 2, it is necessary to provide a clearance in the radial direction (R) both between the rotating body (97) and the fixed body (96) of the rotation sensor (18) and between the fixed body (96) and the cylinder forming portion, which results in the increase in dimension of the vehicle drive device (1) in the radial direction (R).

It is desired to realize a vehicle drive device that can reduce the manufacturing cost and suppress the increase in dimensions in the axial direction and the radial direction.

Means for Solving the Problem

As the characteristic configuration of a vehicle drive device in view of the above, a vehicle drive device includes:
an input member drivingly connected to an internal combustion engine;
a rotary electric machine including a stator and a rotor that is disposed on an inner side in a radial direction with respect to the stator, and functioning as a driving force source for wheels;
a transmission that changes a speed of rotation transmitted from the rotary electric machine side;
a rotor support member that supports the rotor;
a rotation sensor that detects rotation of the rotor; and
a first engagement device disposed on the inner side in the radial direction with respect to the rotor,
the first engagement device being disposed in a power transmission path between the rotary electric machine and the transmission, in which:
the first engagement device includes a first friction member and a first piston portion that presses the first friction member in an axial direction;
when in the axial direction, one side in the axial direction with respect to the first engagement device is defined as a first side in the axial direction, and a side opposite to the first side in the axial direction is defined as a second side in the axial direction,
the rotor support member includes a tubular portion having a tubular shape extending along the axial direction and supporting the rotor, and a flange portion provided to extend along the radial direction on the inner side in the radial direction with respect to the tubular portion at a position adjacent to the first engagement device on the first side in the axial direction, and connected to the tubular portion;

the flange portion includes a cylinder forming portion protruding to the first side in the axial direction so as to form a cylinder portion on which the first piston portion slides; and the rotation sensor includes a rotating body supported by an outer peripheral surface of the cylinder forming portion on an outer side in the radial direction, and a fixed body disposed on the outer side in the radial direction with respect to the rotating body.

According to this configuration, the flange portion of the rotor support member includes the cylinder forming portion protruding to the one side in the axial direction so as to form the cylinder portion on which the first piston portion of the first engagement device slides. The rotating body of the rotation sensor is supported by the outer peripheral surface of the cylinder forming portion. Therefore, it is not necessary to separately provide a member for supporting the rotating body. This can reduce the manufacturing cost of the vehicle drive device.

Further, according to this configuration, the rotating body of the rotation sensor is supported by the outer peripheral surface of the cylinder forming portion, and the fixed body of the rotation sensor is disposed on the outer side in the radial direction with respect to the rotating body. With this, the rotation sensor can be disposed using the space overlapping with the cylinder forming portion as seen in the radial direction. Further, it is not necessary to provide a clearance in the radial direction between the rotation sensor and the cylinder forming portion. Thus, it is possible to suppress an increase in dimensions of the vehicle drive device in the axial direction and the radial direction.

MODES FOR CARRYING OUT THE DISCLOSURE

Figure 1:
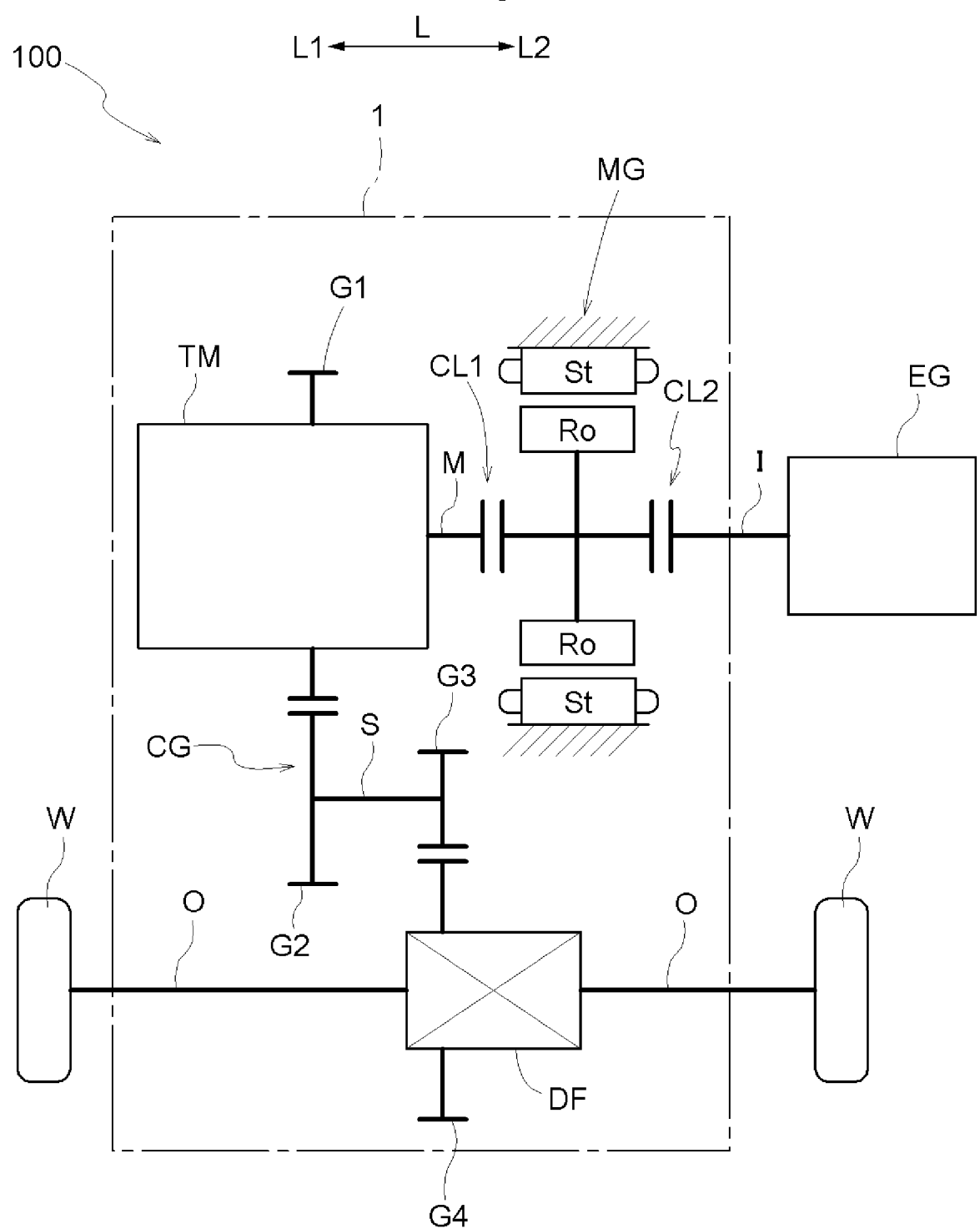
FIG. 1 is a schematic view showing a schematic configuration of a vehicle drive device according to an embodiment.

Hereinafter, a vehicle drive device 100 according to an embodiment will be described with reference to the drawings. As shown in FIG. 1, the vehicle drive device 100 is a device for driving a vehicle including both an internal combustion engine EG and a rotary electric machine MG (hybrid vehicle). Specifically, the vehicle drive device 100 is configured as a drive device for a one-motor parallel hybrid vehicle.

In the following description, unless otherwise specified, an "axial direction L", a "radial direction R", and a "circumferential direction" are defined with reference to a rotation axis of the rotary electric machine MG. In the radial direction R, the rotation axis side of the rotary electric machine MG is referred to as an "inner side R1 in the radial direction", and the opposite side is referred to as an "outer side R2 in the radial direction".

The direction of each member represents a direction of the member that is assembled to the vehicle drive device 100. In addition, terms related to the direction, the position, and the like of each member represent concepts that include a state in which there is a difference due to an error that is allowed in manufacturing.

As shown in FIG. 1, the vehicle drive device 100 includes an input member I, a rotary electric machine MG, a transmission TM, and a first engagement device CL1. In the present embodiment, the vehicle drive device 100 further includes a second engagement device CL2, a counter gear mechanism CG, a differential gear mechanism DF, and a pair of output members O. In the present embodiment, part of the input member I, part of the output members O, the first engagement device CL1, the second engagement device CL2, the rotary electric machine MG, the transmission TM, the counter gear mechanism CG, and the differential gear mechanism DF are accommodated in a case 1.

The rotary electric machine MG functions as a driving force source for wheels W. The rotary electric machine MG can function as a motor (electric motor) that receives supply of electric power to generate driving force, and as a generator (electric power generator) that receives supply of driving force to generate electric power. Therefore, the rotary electric machine MG is electrically connected to a power storage device (battery, capacitor, and the like). The rotary electric machine MG receives electric power supplied from the power storage device to perform power running, or supplies electric power generated with torque of the internal combustion engine EG or inertial force of the vehicle to the power storage device to cause the power storage device to store the electric power.

The internal combustion engine EG functions as a driving force source for the wheels W, similarly to the rotary electric machine MG. The internal combustion engine EG is a motor (gasoline engine, diesel engine, and the like) that is driven by combustion of fuel to take out driving force.

The input member I is drivingly connected to the internal combustion engine EG. In the present embodiment, the input member I is drivingly connected to the output shaft (crankshaft and the like) of the internal combustion engine EG via a damper device (not shown) that attenuates fluctuations in the transmitted torque.

In the present application, "drivingly connected" refers to a state in which two rotation elements are connected so that a driving force can be transmitted, and includes a state in which the two rotation elements are connected so as to rotate integrally or a state in which the two rotation elements are connected so as to be able to transmit a driving force via one or two or more transmitting members. Such transmitting members include various members that transmit rotation at the same speed or at a changed speed, such as a shaft, a gear mechanism, a belt, and a chain, for example. The transmitting members may include an engagement device that selectively transmits rotation and driving force, such as a friction engagement device, an intermeshing engagement device, and the like.

Figure 2:
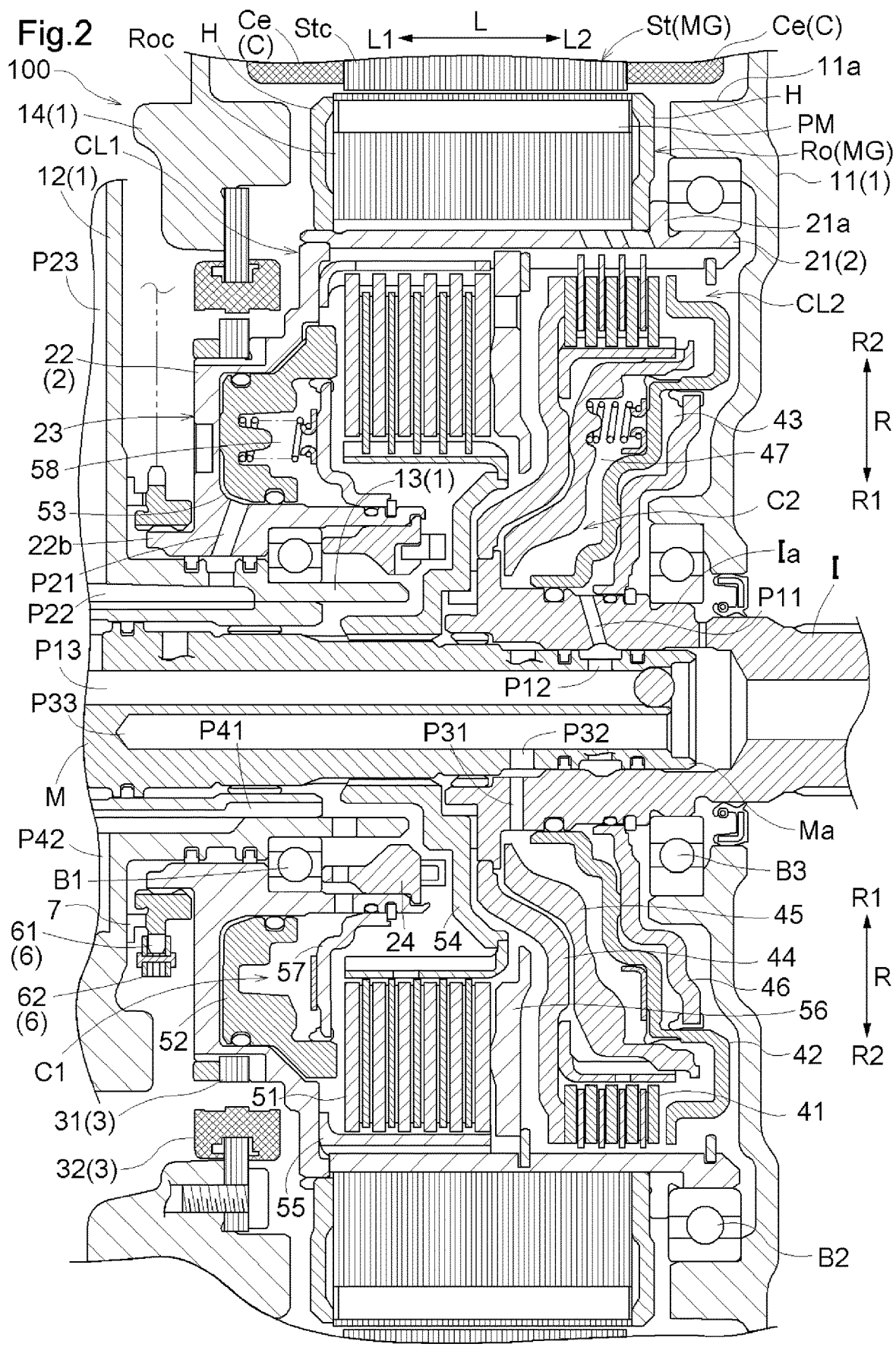
FIG. 2 is a partial sectional view of the vehicle drive device according to the embodiment.

Each of the first engagement device CL1 and the second engagement device CL2 is an engagement device that connects and disconnects the power transmission between the two rotation elements. As shown in FIG. 2, the first engagement device CL1 and the second engagement device CL2 are arranged side by side in the axial direction L. In the present embodiment, the rotary electric machine MG and the transmission TM are arranged side by side in the axial direction L. The first engagement device CL1 is disposed on the transmission TM side in the axial direction L with respect to the second engagement device CL2.

In the following description, in the axial direction L, the side on which the first engagement device CL1 is disposed with respect to the second engagement device CL2 is referred to as a "first side L1 in the axial direction", and the opposite side thereto is referred to as a "second side L2 in the axial direction".

As shown in FIG. 1, in the present embodiment, the second engagement device CL2 is disposed in the power transmission path between the input member I and the rotary electric machine MG. Thus, the second engagement device CL2 connects or disconnects between the input member I and the rotary electric machine MG. In the present embodiment, the engagement state (directly connected engagement state/slip-engagement state/released state) of the second engagement device CL2 is controlled based on the hydraulic pressure supplied to the second engagement device CL2.

The first engagement device CL1 is disposed in the power transmission path between the rotary electric machine MG and the transmission TM. The first engagement device CL1 connects or disconnects between a transmission input shaft M that is an input element of the transmission TM and the rotary electric machine MG. In the present embodiment, the engagement state (directly connected engagement state/slip-engagement state/released state) of the first engagement device CL1 is controlled based on the hydraulic pressure supplied to the first engagement device CL1.

The transmission TM is a device that changes the speed of rotation transmitted from the rotary electric machine MG side. Specifically, the transmission TM changes the speed of rotation and torque input to the transmission input shaft M in accordance with the speed ratio at each time point and performs torque conversion, and transmits the torque to a transmission output gear G1 that is an output element of the transmission TM. In the present embodiment, the transmission TM is an automatic stepped transmission provided with a plurality of engagement devices for shifting and capable of switching a plurality of shift speeds having different speed ratios. As the transmission TM, an automatic continuously variable transmission that can change the speed ratio steplessly, a manual stepped transmission that switchably includes a plurality of shift speeds having different speed ratios, and the like may be used.

The counter gear mechanism CG includes a counter input gear G2 and a counter output gear G3. The counter input gear G2 is an input element of the counter gear mechanism CG. The counter input gear G2 meshes with the transmission output gear G1. The counter output gear G3 is an output element of the counter gear mechanism CG. The counter output gear G3 is connected to the counter input gear G2 so as to rotate integrally with the counter input gear G2. In the present embodiment, the counter output gear G3 is connected to the counter input gear G2 via a counter shaft S extending in the axial direction L. In the illustrated example, the counter output gear G3 is disposed on the second side L2 in the axial direction with respect to the counter input gear G2.

The differential gear mechanism DF includes a differential input gear G4 that meshes with the counter output gear G3 of the counter gear mechanism CG. The differential gear mechanism DF distributes the rotation of the differential input gear G4 to the pair of output members O drivingly connected to the wheels W.

In the vehicle drive device 100 configured as described above, the engagement states of the first engagement device CL1 and the second engagement device CL2 are switched so that the torque of one or both of the internal combustion engine EG and the rotary electric machine MG can be transmitted to the wheels W, thereby causing the vehicle to travel. The vehicle drive device 100 according to the present embodiment has a multi-axis configuration, in which the input member I and the transmission input shaft M are arranged coaxially, and the pair of output members O is arranged on an axis that is different from but parallel to the axis on which the input member I and the transmission input shaft M are arranged. Such a configuration is suitable, for example, as a configuration of the vehicle drive device 100 mounted on an FF (front engine-front drive) vehicle.

As shown in FIG. 2, in the present embodiment, the case 1 includes a first side wall portion 11, a second side wall portion 12, and a tubular protruding portion 13. Although not shown, the case 1 according to the present embodiment includes a peripheral wall portion that covers the rotary electric machine MG from the outer side R2 in the radial direction, between the first side wall portion 11 and the second side wall portion 12 in the axial direction L.

The first side wall portion 11 extends along the radial direction R. The first side wall portion 11 is disposed on the second side L2 in the axial direction with respect to the rotary electric machine MG and the second engagement device CL2. The input member I passes through the first side wall portion 11 in the axial direction L. A portion of the input member I on the second side L2 in the axial direction with respect to the first side wall portion 11 is connected to the damper device described above.

The second side wall portion 12 extends along the radial direction R. The second side wall portion 12 corresponds to a "radially extending portion". The second side wall portion 12 is disposed on the first side L1 in the axial direction with respect to the rotary electric machine MG and the first engagement device CL1. The transmission input shaft M passes through the second side wall portion 12 in the axial direction L.

The tubular protruding portion 13 has a tubular shape protruding in the axial direction L from the second side wall portion 12. In the present embodiment, the tubular protruding portion 13 is provided so as to protrude to the second side L2 in the axial direction from the second side wall portion 12. The tubular protruding portion 13 has a tubular shape covering the outer side R2 of the transmission input shaft M in the radial direction. Further, in the present embodiment, an end portion of the tubular protruding portion 13 on the second side L2 in the axial direction is located on the first side L1 in the axial direction with respect to an end portion of the input member I on the first side L1 in the axial direction. That is, the tubular protruding portion 13 is spaced apart from the input member I in the axial direction L.

Figure 3:
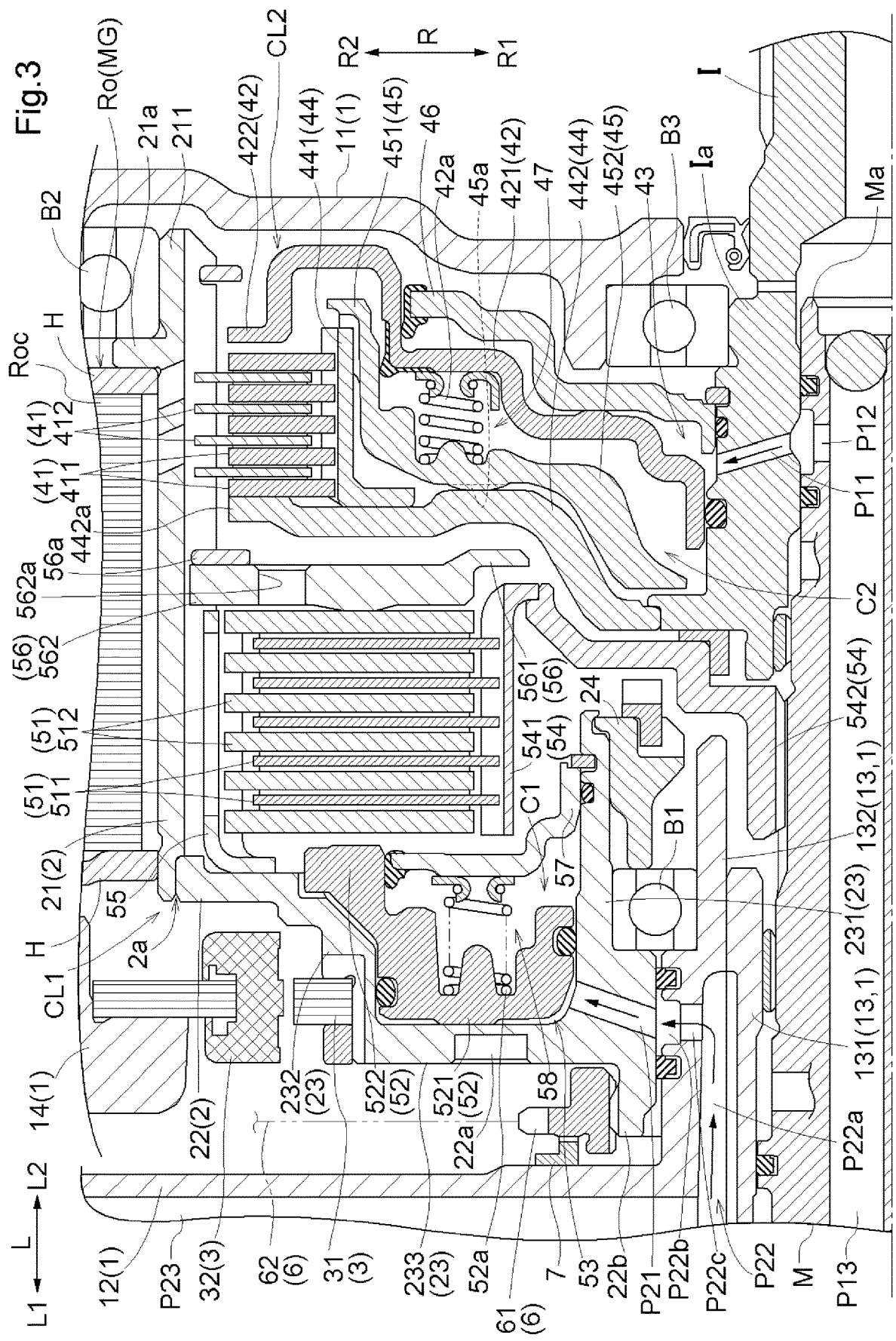
FIG. 3 is a partially-enlarged sectional view of the vehicle drive device according to the embodiment.
Figure 4:
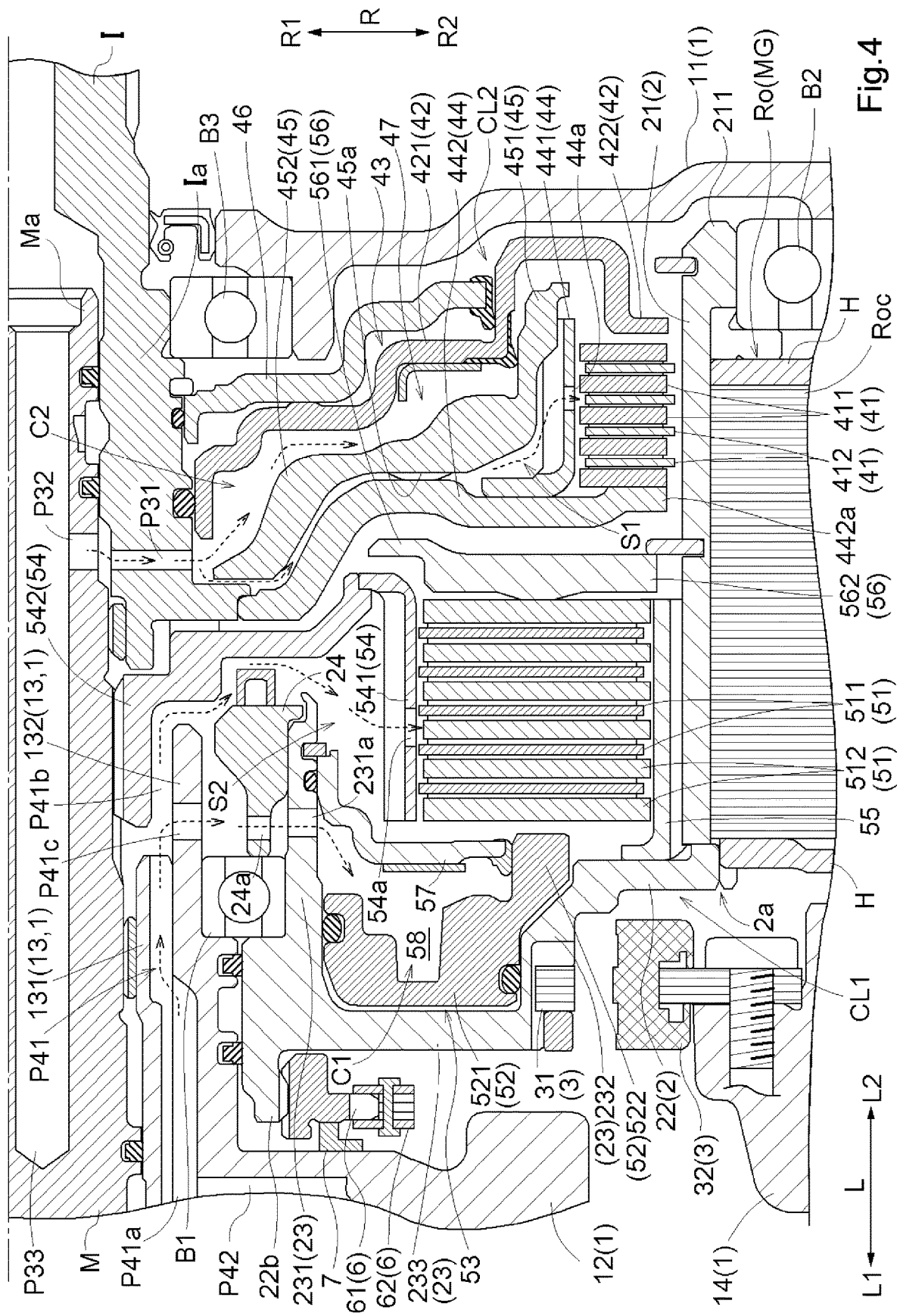
FIG. 4 is a partially-enlarged sectional view of the vehicle drive device according to the embodiment.

As shown in FIGS. 3 and 4, in the present embodiment, the tubular protruding portion 13 has an inner protruding portion 131 and an outer protruding portion 132. The inner protruding portion 131 and the outer protruding portion 132 are connected to each other with the outer peripheral surface of the inner protruding portion 131 and the inner peripheral surface of the outer protruding portion 132 being in contact with each other. The end portion of the outer protruding portion 132 on the second side L2 in the axial direction is located on the second side L2 in the axial direction with respect to the end portion of the inner protruding portion 131 on the second side L2 in the axial direction.

In the present embodiment, the input member I includes an input tubular portion Ia having a tubular shape with its end surface on one side in the axial direction L (here, the first side L1 in the axial direction) being open. The transmission input shaft M includes an insertion portion Ma inserted to the inner side R1 of the input tubular portion Ia in the radial direction. The input member I and the transmission input shaft M are configured to rotate relative to each other.

As shown in FIG. 2, the rotary electric machine MG includes a stator St and a rotor Ro that is disposed on the inner side R1 in the radial direction with respect to the stator St. The stator St is fixed to a non-rotating member. In the present embodiment, the stator St is fixed to the first side wall portion 11 of the case 1 with fixing members such as bolts. That is, the first side wall portion 11 is disposed on the second side L2 in the axial direction with respect to the rotary electric machine MG, and corresponds to a "stator support portion" that supports the stator St. In the present embodiment, the stator St includes a stator core Stc and a coil C wound around the stator core Stc such that coil end portions Ce are provided protruding from the stator core Stc to both sides in the axial direction L (the first side L1 in the axial direction and the second side L2 in the axial direction). The rotor Ro is configured to be rotatable with respect to the stator St. In the present embodiment, the rotor Ro includes a rotor core Roc, a pair of holding members H that holds the rotor core Roc from both sides in the axial direction L, and permanent magnets PM arranged in the rotor core Roc. In the present embodiment, each of the stator core Stc and the rotor core Roc is formed by stacking a plurality of annular plate-shaped magnetic bodies (for example, electromagnetic steel plates or the like) in the axial direction L.

The vehicle drive device 100 includes a rotor support member 2 that supports the rotor Ro. The rotor support member 2 includes a tubular portion 21 having a tubular shape extending along the axial direction L and a flange portion 22 provided to extend along the inner side R1 in the radial direction on the inner side of the tubular portion 21.

The tubular portion 21 supports the rotor Ro in the radial direction R and the axial direction L. Specifically, the tubular portion 21 is connected to the rotor Ro so as to rotate integrally with the rotor Ro. In the present embodiment, the rotor Ro is attached to an outer peripheral surface of the tubular portion 21. Thus, the tubular portion 21 supports the rotor Ro from the inner side R1 in the radial direction. The rotor Ro is attached to the outer peripheral surface of the tubular portion 21 by welding, clinching, or the like.

The flange portion 22 is disposed on the first side L1 in the axial direction with respect to the first engagement device CL1 and adjacent to the first engagement device CL1. In the present embodiment, the flange portion 22 is disposed on the second side L2 in the axial direction with respect to the second side wall portion 12. Further, in the present embodiment, the flange portion 22 has an annular plate shape extending along the radial direction R and the circumferential direction.

The flange portion 22 is connected to the tubular portion 21 so as to rotate integrally with the tubular portion 21. In the present embodiment, the flange portion 22 is a member independent of the tubular portion 21, and is joined to the tubular portion 21 by, for example, welding, clinching, or the like. That is, the tubular portion 21 and the flange portion 22, which are separate members, are joined to each other. In the illustrated example, the flange portion 22 and the tubular portion 21 are joined by welding such that the end portion of the flange portion 22 on the outer side R2 in the radial direction and the end portion of the tubular portion 21 on the first side L1 in the axial direction are connected to each other.

As shown in FIG. 3, in the present embodiment, a joint portion 2a between the tubular portion 21 and the flange portion 22 is disposed on the outer side R2 in the radial direction with respect to the inner peripheral surface of the tubular portion 21. In the illustrated example, a plurality of splines extending in the axial direction L is provided on the inner peripheral portion of the tubular portion 21 over the entire area in the axial direction L so as to be distributed in the circumferential direction. The joint portion 2a is disposed on the outer side R2 in the radial direction with respect to the bottom surfaces (the end portions on the outer side R2 in the radial direction) of recessed grooves recessed in the outer side R2 in the radial direction, which constitute the splines. That is, in such a configuration, the "inner peripheral surface" of the tubular portion 21 refers to a virtual plane formed by connecting the end portions of the splines on the outer side R2 in the radial direction, which are provided on the inner peripheral portion of the tubular portion 21.

In the present embodiment, the first engagement device CL1 and the second engagement device CL2 are disposed on the inner side R1 in the radial direction with respect to the rotor Ro, at positions overlapping with the rotor Ro as seen in the radial direction along the radial direction R. Here, the "inner side R1 in the radial direction" represents the inner side in the radial direction R with respect to a target element regardless of the position in the axial direction L. The same applies to the "outer side R2 in the radial direction". Further, regarding the arrangement of two elements, "overlap as seen in a specific direction" means that when a virtual straight line parallel to the direction of line of sight is moved in directions orthogonal to the virtual straight line, there is at least an area where the virtual straight line intersects both the two elements.

In the present embodiment, the second engagement device CL2 includes a second friction member 41, a second piston portion 42 that presses the second friction member 41 in the axial direction L, a second hydraulic oil chamber 43 to which oil for operating the second piston portion 42 is supplied, and an oil chamber forming member 46 extending on the outer side R2 in the radial direction with respect to the input member I and connected to the input member I so as to rotate integrally with the input member I.

The second friction member 41 includes a second inner friction material 411 and a second outer friction material 412 in a pair. The second inner friction material 411 and the second outer friction material 412 both have an annular plate shape, and are disposed such that their rotation axes coincide with each other. Further, a plurality of the second inner friction materials 411 and a plurality of the second outer friction materials 412 are provided, which are arranged alternately along the axial direction L. Either the second inner friction materials 411 or the second outer friction materials 412 may be friction plates and the remaining may be separate plates.

In the present embodiment, the second outer friction materials 412 are supported by the tubular portion 21 of the rotor support member 2 from the outer side R2 in the radial direction. In the illustrated example, as described above, the splines extending in the axial direction L are provided on the inner peripheral portion of the tubular portion 21 so as to be distributed in the circumferential direction. On the other hand, similar splines are provided on the outer peripheral portions of the second outer friction materials 412. When the splines are engaged with each other, the second outer friction materials 412 are supported by the tubular portion 21 from the outer side R2 in the radial direction. In this way, the second outer friction materials 412 are supported so as to be slidable in the axial direction L with their relative rotation with respect to the tubular portion 21 being restricted.

In the present embodiment, the second inner friction materials 411 are supported by a second inner support member 44. The second inner support member 44 is a member that supports the second friction member 41 from the inner side R1 in the radial direction. In the present embodiment, the second inner support member 44 includes a second tubular support portion 441 having a tubular shape extending along the axial direction L and a second radially extending portion 442 that is provided to extend to the inner side R1 in the radial direction from the second tubular support portion 441.

The second tubular support portion 441 supports the second friction member 41. In the present embodiment, the second tubular support portion 441 supports the second inner friction materials 411 from the inner side R1 in the radial direction. In the illustrated example, a plurality of splines extending in the axial direction L is provided on the outer peripheral portion of the second tubular support portion 441 over the entire area in the axial direction L so as to be distributed in the circumferential direction. On the other hand, similar splines are provided on the inner peripheral portions of the second inner friction materials 411. When the splines are engaged with each other, the second inner friction materials 411 are supported by the second tubular support portion 441 from the inner side R1 in the radial direction. In this way, the second inner friction materials 411 are supported so as to be slidable in the axial direction L with their relative rotation with respect to the second tubular support portion 441 being restricted.

The second radially extending portion 442 corresponds to the "radially extending support portion". The second radially extending portion 442 is connected to the second tubular support portion 441 so as to rotate integrally with the second tubular support portion 441. In the present embodiment, the second radially extending portion 442 is a member independent of the second tubular support portion 441, and is joined to the second tubular support portion 441 by, for example, welding, clinching, or the like. In the illustrated example, the second radially extending portion 442 and the second tubular support portion 441 are joined to each other by welding with the surface of the second radially extending portion 442 on the second side L2 in the axial direction and the surface of the second tubular support portion 441 on the first side L1 in the axial direction being in contact with each other. The second radially extending portion 442 is connected to the input member I so as to rotate integrally with the input member I. In the present embodiment, the end portion of the second radially extending portion 442 on the inner side R1 in the radial direction is connected to the outer peripheral surface of the input member I. In the illustrated example, the end portion of the second radially extending portion 442 on the inner side R1 in the radial direction and a flange-shaped protruding portion provided on the outer peripheral surface of the input member I are joined by welding. Further, in the present embodiment, the second radially extending portion 442 has an annular plate shape extending along the radial direction R and the circumferential direction.

In the present embodiment, the second engagement device CL2 includes a contact portion 442a that contacts the second friction member 41 from the side opposite to the second piston portion 42 side in the axial direction L (here, the first side L1 in the axial direction). In the illustrated example, the contact portion 442a is integrally formed with the second radially extending portion 442. Specifically, the contact portion 442a is formed of a portion of the second radially extending portion 442 that extends more toward the outer side R2 in the radial direction than the second tubular support portion 441. In the present embodiment, the contact portion 442a is disposed so as to contact the second inner friction material 411 located most toward the first side L1 in the axial direction, from the first side L1 in the axial direction.

The second radially extending portion 442 is in contact with an oil passage forming member 45 in the axial direction L. In the present embodiment, the second radially extending portion 442 is in contact with the oil passage forming member 45 from the first side L1 in the axial direction.

The oil passage forming member 45 is a member forming an oil passage in the second engagement device CL2. In the present embodiment, the oil passage forming member 45 is disposed between the second radially extending portion 442 and the second piston portion 42 in the axial direction L. Further, in the present embodiment, the oil passage forming member 45 is disposed on the inner side R1 in the radial direction with respect to the second tubular support portion 441 at a position overlapping with the second tubular support portion 441 as seen in the radial direction along the radial direction R. In the present embodiment, the oil passage forming member 45 includes a connecting portion 451 and a partition portion 452.

The connecting portion 451 has a tubular shape extending along the axial direction L. The connecting portion 451 is connected to the second tubular support portion 441 of the second inner support member 44 so as to rotate integrally with the second tubular support portion 441. In the present embodiment, the connecting portion 451 is connected to the second tubular support portion 441 with the connecting portion 451 located on the inner side R1 in the radial direction with respect to the second tubular support portion 441 and adjacent to the second tubular support portion 441. Specifically, a plurality of splines extending in the axial direction L is provided on the inner peripheral portion of the second tubular support portion 441 so as to be distributed in the circumferential direction. On the other hand, similar splines are provided on the outer peripheral portion of the connecting portion 451. When the splines are engaged with each other, the connecting portion 451 is connected to the second tubular support portion 441 so as to rotate integrally with the second tubular support portion 441.

The partition portion 452 is provided to extend to the inner side R1 in the radial direction from the connecting portion 451. In the present embodiment, the partition portion 452 and the connecting portion 451 are integrally formed such that the end portion of the partition portion 452 on the outer side R2 in the radial direction and the end portion of the connecting portion 451 on the first side L1 in the axial direction are connected to each other. The partition portion 452 is disposed so as to partition the space between the second piston portion 42 and the second inner support member 44.

In the present embodiment, the contact surface of the oil passage forming member 45 with respect to the second radially extending portion 442 is provided with a radial groove 45a extending along the radial direction R. In the present embodiment, the partition portion 452 is in contact with the second radially extending portion 442 from the second side L2 in the axial direction in at least part of the entire area of the partition portion 452 in radial direction R. The contact surface of the partition portion 452 with respect to the second radially extending portion 442 is provided with the radial groove 45a. The radial groove 45a is provided so as to be continuous over the entire area, in the radial direction R, of the contact surface of the partition portion 452 with respect to the second radially extending portion 442. That is, the radial groove 45a is provided so as to connect the inner side R1 in the radial direction and the outer side R2 in the radial direction for the contact portion between the partition portion 452 and the second radially extending portion 442. In the present embodiment, a plurality of the radial grooves 45a is provided so as to be distributed in the circumferential direction.

In the present embodiment, the second piston portion 42 is configured to press the second friction member 41 in the axial direction L with a pressure corresponding to the hydraulic pressure supplied to the second hydraulic oil chamber 43. Further, in the present embodiment, the second piston portion 42 is disposed on the second side L2 in the axial direction with respect to the second radially extending portion 442 of the second inner support member 44. The second piston portion 42 includes a second sliding portion 421 and a second pressing portion 422.

The second sliding portion 421 extends along the radial direction R. In the present embodiment, the second sliding portion 421 has an annular plate shape extending along the radial direction R and the circumferential direction. The second sliding portion 421 is configured to slide in the axial direction L in the second cylinder portion C2. In the present embodiment, the second sliding portion 421 is disposed on the inner side R1 in the radial direction with respect to the second friction member 41 at a position overlapping with the second friction member 41 as seen in the radial direction along the radial direction R.

The second cylinder portion C2 has a tubular shape extending along the axial direction L. In the present embodiment, the second cylinder portion C2 is formed of the input member I and the oil passage forming member 45. Specifically, part of the outer peripheral surface of an input tubular portion Ia of the input member I functions as a sliding surface on which the end portion of the second sliding portion 421 on the inner side R1 in the radial direction slides. That is, the second piston portion 42 is disposed so as to contact the outer peripheral surface of the input member I. Further, part of the inner peripheral surface of the connecting portion 451 of the oil passage forming member 45 functions as a sliding surface on which the end portion of the second sliding portion 421 on the outer side R2 in the radial direction slides.

The second pressing portion 422 extends to the outer side R2 in the radial direction from the second sliding portion 421 so as to be adjacent to the second friction member 41 in the axial direction L. In the present embodiment, the second pressing portion 422 is disposed on the opposite side of the second friction member 41 from the contact portion 442a side of the second radially extending portion 442 in the axial direction L (here, the second side L2 in the axial direction). Thus, the second pressing portion 422 is provided to extend from the end portion of the second sliding portion 421 on the outer side R2 in the radial direction toward the outer side R2 in the radial direction while bypassing the second tubular support portion 441 on the second side L2 in the axial direction.

In the present embodiment, the second piston portion 42 is urged by a second urging member 42a toward the second side L2 in the axial direction. The second urging member 42a is disposed between the second sliding portion 421 and the partition portion 452 of the oil passage forming member 45 in the axial direction L. In the present embodiment, a plurality of the second urging members 42a is arranged so as to be distributed in the circumferential direction. As the second urging member 42a, for example, a return spring or the like can be used. Thus, when oil of a predetermined hydraulic pressure is supplied to the second hydraulic oil chamber 43 from the hydraulic control device (not shown), the second piston portion 42 slides to the first side L1 in the axial direction against the urging force of the second urging members 42a in accordance with the hydraulic pressure and presses the second friction member 41 to the first side L1 in the axial direction.

The second hydraulic oil chamber 43 is disposed adjacent to the second piston portion 42 in the axial direction L. In the present embodiment, the second hydraulic oil chamber 43 is provided between the second piston portion 42 and the oil chamber forming member 46. Specifically, the second hydraulic oil chamber 43 is provided between the second sliding portion 421 of the second piston portion 42 and the oil chamber forming member 46 in the axial direction L.

In the present embodiment, the second hydraulic oil chamber 43 is disposed so as to overlap with the second friction member 41 as seen in the radial direction along the radial direction R. In the present embodiment, the second hydraulic oil chamber 43 is disposed so as not to overlap with the second friction member 41 as seen in the axial direction along the axial direction L.

In the present embodiment, the oil chamber forming member 46 is disposed so as to contact the outer peripheral surface of the input tubular portion Ia of the input member I. Further, in the present embodiment, the oil chamber forming member 46 is disposed on the second side L2 in the axial direction with respect to the second piston portion 42. Here, the oil chamber forming member 46 is disposed on the second side L2 in the axial direction with respect to the second sliding portion 421 of the second piston portion 42 and adjacent to the second sliding portion 421.

In the present embodiment, the dimension of the outermost peripheral portion of the oil chamber forming member 46 in the radial direction R is smaller than the dimension of the inner peripheral surface of the second tubular support portion 441 in the radial direction R. Further, in the present embodiment, the oil chamber forming member 46 is disposed on the inner side R1 in the radial direction with respect to the connecting portion 451 of the oil passage forming member 45. Thus, the second piston portion 42 is provided so as to extend between the oil chamber forming member 46 and the connecting portion 451 in the radial direction R to the second side L2 in the axial direction and further extend to the outer side R2 in the radial direction, so that the second pressing portion 422 is disposed on the outer side R2 in the radial direction with respect to the connecting portion 451.

In the present embodiment, a second cancel oil chamber 47 is provided on the opposite side of the second piston portion 42 from the second hydraulic oil chamber 43 side in the axial direction L (here, the first side L1 in the axial direction). The second cancel oil chamber 47 is a space for generating a hydraulic pressure against the centrifugal hydraulic pressure generated in the second hydraulic oil chamber 43. In the present embodiment, the second cancel oil chamber 47 is provided between the second piston portion 42 and the oil passage forming member 45. That is, a portion of the space between the second piston portion 42 and the second inner support member 44 on the second side L2 in the axial direction with respect to the partition portion 452 of the oil passage forming member 45 functions as the second cancel oil chamber 47.

As shown in FIG. 3, the first engagement device CL1 includes a first friction member 51 and a first piston portion 52 that presses the first friction member 51 in the axial direction L. In the present embodiment, the first engagement device CL1 further includes a first hydraulic oil chamber 53 to which oil for operating the first piston portion 52 is supplied.

The first friction member 51 includes a first inner friction material 511 and a first outer friction material 512 in a pair. The first inner friction material 511 and the first outer friction material 512 both have an annular plate shape, and are disposed such that their rotation axes coincide with each other. Further, a plurality of the first inner friction materials 511 and a plurality of the first outer friction materials 512 are provided, which are arranged alternately along the axial direction L. Either the first inner friction materials 511 or the first outer friction materials 512 may be friction plates and the remaining may be separate plates.

In the present embodiment, the first inner friction materials 511 are supported by a first inner support member 54. The first inner support member 54 is a member that supports the first friction member 51 from the inner side R1 in the radial direction. In the present embodiment, the first inner support member 54 includes a first tubular support portion 541 having a tubular shape extending along the axial direction L and a first radially extending portion 542 that is provided to extend to the inner side R1 in the radial direction from the first tubular support portion 541.

The first tubular support portion 541 supports the first friction member 51. In the present embodiment, the first tubular support portion 541 supports the first inner friction materials 511 from the inner side R1 in the radial direction. In the illustrated example, a plurality of splines extending in the axial direction L is provided on the outer peripheral portion of the first tubular support portion 541 over the entire area in the axial direction L so as to be distributed in the circumferential direction. On the other hand, similar splines are provided on the inner peripheral portions of the first inner friction materials 511. When the splines are engaged with each other, the first inner friction materials 511 are supported by the first tubular support portion 541 from the inner side R1 in the radial direction. In this way, the first inner friction materials 511 are supported so as to be slidable in the axial direction L with their relative rotation with respect to the first tubular support portion 541 being restricted.

The first radially extending portion 542 is connected to the first tubular support portion 541 so as to rotate integrally with the first tubular support portion 541. In the present embodiment, the first radially extending portion 542 is a member independent of the first tubular support portion 541, and is joined to the first tubular support portion 541 by, for example, welding, clinching, or the like. In the illustrated example, the first radially extending portion 542 and the first tubular support portion 541 are joined to each other by welding such that the end portion of the first radially extending portion 542 on the outer side R2 in the radial direction and the end portion of the first tubular support portion 541 on the second side L2 in the axial direction are connected to each other. In the present embodiment, the first radially extending portion 542 has an annular plate shape extending along the radial direction R and the circumferential direction.

The first radially extending portion 542 is connected to the transmission input shaft M so as to rotate integrally with the transmission input shaft M. In the present embodiment, the end portion of the first radially extending portion 542 on the inner side R1 in the radial direction is connected to the outer peripheral surface of the transmission input shaft M. In the illustrated example, a plurality of splines extending in the axial direction L is provided on the inner peripheral surface of the tubular portion provided at the end portion of the first radially extending portion 542 on the inner side R1 in the radial direction so as to be distributed in the circumferential direction. On the other hand, similar splines are provided on the outer peripheral surface of the transmission input shaft M. When the splines are engaged with each other, the first radially extending portion 542 and the transmission input shaft M are connected to each other so as to rotate integrally.

In the present embodiment, the first outer friction materials 512 are supported by an outer support member 55. The outer support member 55 is a member that supports the first friction member 51 from the outer side R2 in the radial direction. In the present embodiment, the outer support member 55 has a tubular shape extending along the axial direction L. In the illustrated example, a plurality of splines extending in the axial direction L is provided on the inner peripheral portion of the outer support member 55 so as to be distributed in the circumferential direction. On the other hand, similar splines are provided on the outer peripheral portions of the first outer friction materials 512. When the splines are engaged with each other, the first outer friction materials 512 are supported by the outer support member 55 from the outer side R2 in the radial direction. In this way, the first outer friction materials 512 are supported so as to be slidable in the axial direction L with their relative rotation with respect to the outer support member 55 being restricted.

In the present embodiment, the outer support member 55 is supported by the tubular portion 21 of the rotor support member 2 from the outer side R2 in the radial direction. In the illustrated example, a plurality of splines extending in the axial direction L is provided on the outer peripheral portion of the outer support member 55 so as to be distributed in the circumferential direction. On the other hand, as described above, the splines extending in the axial direction L are provided on the inner peripheral portion of the tubular portion 21 so as to be distributed in the circumferential direction. When the splines are engaged with each other, the outer support member 55 is supported by the tubular portion 21 from the outer side R2 in the radial direction. In this way, the first outer friction materials 512 are supported by the tubular portion 21 of the rotor support member 2 via the outer support member 55.

In the present embodiment, the first engagement device CL1 includes a contact member 56 that contacts the first friction member 51. The contact member 56 is disposed so as to contact the first friction member 51 from the side opposite to the first piston portion 52 side in the axial direction L (here, the second side L2 in the axial direction). In the present embodiment, the contact member 56 is disposed so as to contact the first outer friction material 512 located most toward the second side L2 in the axial direction, from the second side L2 in the axial direction.

In the present embodiment, the contact member 56 includes: an inner portion 561 that is a predetermined radial area including the end portion of the contact member 56 on the inner side R1 in the radial direction; and an outer portion 562 that is an area on the outer side R2 in the radial direction with respect to the inner portion 561. In the illustrated example, the outer portion 562 is provided with a through hole 562a passing through the outer portion 562 in the axial direction L.

In the present embodiment, the end portion of the outer portion 562 on the outer side R2 in the radial direction is connected to the tubular portion 21 such that the contact member 56 is supported by the tubular portion 21 from the outer side R2 in the radial direction. In the illustrated example, a plurality of splines extending in the axial direction L is provided on the outer peripheral portion of the outer portion 562 so as to be distributed in the circumferential direction. When the splines are engaged with the splines provided on the inner peripheral portion of the tubular portion 21, the contact member 56 is supported by the tubular portion 21 from the outer side R2 in the radial direction while relative rotation of the contact member 56 with respect to the tubular portion 21 is restricted and the contact member 56 is slidable in the axial direction L. Further, in the illustrated example, an annular fixing member 56*a* is fixed to the inner peripheral portion of the tubular portion 21 so as to contact the outer portion 562 from the second side L2 in the axial direction. In this way, the movement of the contact member 56 to the second side L2 in the axial direction is restricted by the fixing member 56*a*. As the fixing member 56*a*, for example, a snap ring is used.

In the present embodiment, the end portion of the contact member 56 on the inner side R1 in the radial direction is disposed on the inner side R1 in the radial direction with respect to the end portion of the first friction member 51 (first inner friction materials 511) on the inner side R1 in the radial direction. In the illustrated example, the inner portion 561 of the contact member 56 is disposed so as to overlap with the splines provided on the outer peripheral portion of the first tubular support portion 541 as seen in the axial direction along the axial direction L. Specifically, the arrangement area of the inner portion 561 of the contact member 56 in the radial direction R overlaps with the entire arrangement area of the splines provided on the outer peripheral portion of the first tubular support portion 541 in the radial direction R, and the inner portion 561 of the contact member 56 is continuously provided over the entire outer peripheral portion of the first tubular support portion 541 in the circumferential direction. With such a configuration, a gap from which oil flowing along the splines provided on the outer peripheral portion of the first tubular support portion 541 can flow out on the second side L2 in the axial direction with respect to the first friction member 51 is only a gap where the first tubular support portion 541 and the inner portion 561 face each other in the axial direction L. This gap opens toward the inner side R1 in the radial direction. Since centrifugal force acts on the oil during rotation of the first tubular support portion 541, the outflow of oil from the gap opening toward the inner side R1 in the radial direction is restricted. Thus, with this configuration, the contact member 56 can restrict the flow of oil supplied to the first friction member 51 to the side away from the first friction member 51 in the axial direction L.

In the present embodiment, the dimension of the inner portion 561 in the axial direction L is smaller than the dimension of the outer portion 562 in the axial direction L. In the present embodiment, the inner portion 561 is disposed on the second side L2 in the axial direction with respect to the first tubular support portion 541 at a position overlapping with the first tubular support portion 541 as seen in the axial direction along the axial direction L. The outer portion 562 is disposed on the outer side R2 in the radial direction with respect to the first tubular support portion 541 so as to overlap with the first tubular support portion 541 as seen in the radial direction along the radial direction R.

In the present embodiment, the first piston portion 52 is configured to press the first friction member 51 in the axial direction L with a pressure corresponding to the hydraulic pressure supplied to the first hydraulic oil chamber 53. Further, in the present embodiment, the first piston portion 52 is disposed on the first side L1 in the axial direction with respect to the first friction member 51. That is, the first piston portion 52 is disposed so as not to overlap with the first friction member 51 as seen in the radial direction along the radial direction R. The first piston portion 52 includes a first sliding portion 521 and a first pressing portion 522.

The first sliding portion 521 is configured to slide in the axial direction L in the first cylinder portion C1. The first cylinder portion C1 has a tubular shape extending along the axial direction L. In the present embodiment, the first cylinder portion C1 is formed of a cylinder forming portion 23 of the flange portion 22. That is, in the present embodiment, part of the flange portion 22 constitutes part of the first engagement device CL1.

The cylinder forming portion 23 protrudes to the first side L1 in the axial direction so as to form the first cylinder portion C1 on which the first piston portion 52 slides. In the present embodiment, the cylinder forming portion 23 includes an inner tubular portion 231, an outer tubular portion 232, and a radial connecting portion 233.

The inner tubular portion 231 has a tubular shape extending along the axial direction L. Part of the outer peripheral surface of the inner tubular portion 231 functions as a sliding surface on which the end portion of the first sliding portion 521 on the inner side R1 in the radial direction slides. In the present embodiment, the inner tubular portion 231 is disposed so as to cover the outer side R2 in the radial direction of the tubular protruding portion 13 of the case 1. That is, the tubular protruding portion 13 is disposed so as to extend on the inner side R1 in the radial direction with respect to the cylinder forming portion 23.

The outer tubular portion 232 has a tubular shape extending along the axial direction L. The outer tubular portion 232 is disposed on the outer side R2 in the radial direction with respect to the inner tubular portion 231. Part of the inner peripheral surface of the outer tubular portion 232 functions as a sliding surface on which the end portion of the first sliding portion 521 on the outer side R2 in the radial direction slides.

The radial connecting portion 233 extends along the radial direction R so as to connect the inner tubular portion 231 and the outer tubular portion 232. In the present embodiment, the radial connecting portion 233 has an annular plate shape extending along the radial direction R and the circumferential direction. Further, in the present embodiment, the end portion of the radial connecting portion 233 on the inner side R1 in the radial direction is connected to the end portion of the inner tubular portion 231 on the first side L1 in the axial direction. The end portion of the radial connecting portion 233 on the outer side R2 in the radial direction is connected to the end portion of the outer tubular portion 232 on the first side L1 in the axial direction. A portion of the flange portion 22 that is located on the outer side R2 in the radial direction with respect to the cylinder forming portion 23 has an annular plate shape extending along the radial direction R and the circumferential direction, and is connected to the end portion of the outer tubular portion 232 on the second side L2 in the axial direction. In the illustrated example, the flange portion 22 including the inner tubular portion 231, the outer tubular portion 232, and the radial connecting portion 233 is integrally formed of one member.

The first pressing portion 522 extends from the first sliding portion 521 to the outer side R2 in the radial direction. In the present embodiment, the first pressing portion 522 is disposed on the opposite side of the first friction member 51 from the contact member 56 side in the axial direction L (here, the first side L1 in the axial direction).

In the present embodiment, the first piston portion 52 is urged by a first urging member 52a attached to an attachment member 57 toward the first side L1 in the axial direction. The first urging member 52a is disposed between the first sliding portion 521 and the attachment member 57 in the axial direction L. In the present embodiment, a plurality of the first urging members 52a is arranged so as to be distributed in the circumferential direction. As the first urging member 52a, for example, a return spring or the like can be used. Thus, when oil of a predetermined hydraulic pressure is supplied to the first hydraulic oil chamber 53 from the hydraulic control device (not shown), the first piston portion 52 slides to the second side L2 in the axial direction against the urging force of the first urging members 52a in accordance with the hydraulic pressure and presses the first friction member 51 to the second side L2 in the axial direction.

The attachment member 57 is disposed on the outer side R2 in the radial direction with respect to the inner tubular portion 231 of the cylinder forming portion 23. In the present embodiment, the attachment member 57 is disposed so as to contact the outer peripheral surface of the inner tubular portion 231. In the present embodiment, the attachment member 57 is disposed on the second side L2 in the axial direction with respect to the first sliding portion 521 of the first piston portion 52 and adjacent to the first sliding portion 521.

The first hydraulic oil chamber 53 is disposed adjacent to the first piston portion 52 in the axial direction L. In the present embodiment, the first hydraulic oil chamber 53 is provided between the first piston portion 52 and the cylinder forming portion 23. Specifically, the first hydraulic oil chamber 53 is provided between the first sliding portion 521 of the first piston portion 52 and the radial connecting portion 233 of the cylinder forming portion 23 in the axial direction L.

In the present embodiment, the first hydraulic oil chamber 53 is disposed so as to overlap with the first friction member 51 as seen in the axial direction along the axial direction L. In the present embodiment, the first hydraulic oil chamber 53 is disposed so as not to overlap with the first friction member 51 as seen in the radial direction along the radial direction R.

In the present embodiment, a first cancel oil chamber 58 is provided on the opposite side of the first piston portion 52 from the first hydraulic oil chamber 53 side in the axial direction L (here, the second side L2 in the axial direction). The first cancel oil chamber 58 is a space for generating a hydraulic pressure against the centrifugal hydraulic pressure generated in the first hydraulic oil chamber 53. In the present embodiment, the first cancel oil chamber 58 is provided between the first piston portion 52 and the attachment member 57.

In the present embodiment, the flange portion 22 is provided with an adjusting recess 22a for adjusting the position of the center of gravity of the rotor Ro. Here, the adjusting recess 22a is provided in the surface of the flange portion 22 that faces the first side L1 in the axial direction. In the illustrated example, the adjusting recess 22a is provided such that part of the surface of the radial connecting portion 233 in the cylinder forming portion 23 on the first side L1 in the axial direction recesses toward the second side L2 in the axial direction. The adjusting recess 22a is provided at one or a plurality of locations of the flange portion 22 in the circumferential direction. The adjusting recess 22a is provided on the side to which the position of the center of gravity of the rotor Ro is biased. By providing the adjusting recess 22a to reduce the weight of part of the rotor support member 2 in the circumferential direction, the position of the center of gravity of the rotor Ro is adjusted so as to become closer to the position of the rotation axis of the rotor Ro.

As shown in FIG. 3, the vehicle drive device 100 includes a rotation sensor 3 that detects the rotation of the rotor Ro. The rotation sensor 3 is a sensor for detecting at least one of the position of the rotor Ro in the rotation direction with respect to the stator St and the rotation speed of the rotor Ro. As such a rotation sensor 3, for example, a resolver can be used. The rotation sensor 3 includes a rotating body 31 and a fixed body 32. In the present embodiment, each of the rotating body 31 and the fixed body 32 has an annular shape with reference to the rotation axis of the rotor Ro.

The rotating body 31 is supported by the outer peripheral surface of the cylinder forming portion 23 on the outer side R2 in the radial direction. That is, the rotating body 31 is disposed on the outer side R2 in the radial direction with respect to the cylinder forming portion 23 at a position overlapping with the cylinder forming portion 23 as seen in the radial direction along the radial direction R. In the present embodiment, the rotating body 31 is disposed on the outer peripheral surface of the outer tubular portion 232 of the cylinder forming portion 23. The rotating body 31 is connected to the outer tubular portion 232 so as to rotate integrally with the outer tubular portion 232. In the illustrated example, a plurality of splines extending in the axial direction L is provided on the outer peripheral surface of the cylinder forming portion 23 (here, the outer tubular portion 232) so as to be distributed in the circumferential direction. On the other hand, similar splines are provided on the inner peripheral surface of the rotating body 31. When the splines are engaged with each other, the rotating body 31 and the rotor support member 2 are connected to each other so as to rotate integrally.

The fixed body 32 is disposed on the outer side R2 in the radial direction with respect to the rotating body 31. The fixed body 32 is supported by a non-rotating member. In the present embodiment, the fixed body 32 is supported by a sensor support portion 14 provided on the second side wall portion 12 of the case 1.

In the present embodiment, the rotation sensor 3 is disposed on the outer side R2 in the radial direction with respect to the first sliding portion 521 of the first piston portion 52 at a position overlapping with the first sliding portion 521 as seen in the radial direction along the radial direction R. In the present embodiment, the rotation sensor 3 is disposed so as to overlap with the first friction member 51 as seen in the axial direction along the axial direction L. In the illustrated example, the rotating body 31 is disposed so as to overlap with the first pressing portion 522 of the first piston portion 52 as well as the first friction member 51 as seen in the axial direction. Further, in the present embodiment, the rotation sensor 3 is disposed so as to overlap with the rotor Ro as seen in the axial direction along the axial direction L. In the illustrated example, a portion of the fixed body 32 on the outer side R2 in the radial direction is disposed so as to overlap with the rotor Ro as seen in the axial direction.

As shown in FIG. 3, the vehicle drive device 100 includes a pump driving mechanism 6 for driving a hydraulic pump (not shown). In the present embodiment, the pump driving mechanism 6 includes a first sprocket 61, a second sprocket (not shown), and a chain 62.

The first sprocket 61 is disposed so as to rotate about an axis extending along the axial direction L. In the present embodiment, the rotation axis of the first sprocket 61 is disposed coaxially with the rotation axis of the rotor Ro of the rotary electric machine MG. The second sprocket is disposed so as to rotate about an axis different from the rotation axis of the first sprocket 61 and extending along the axial direction L. The chain 62 is wound so as to extend between the first sprocket 61 and the second sprocket.

The first sprocket 61 corresponds to a "pump driving member" that drives the hydraulic pump. The first sprocket 61 is connected to the rotor support member 2 so as to rotate integrally with the rotor support member 2. In the present embodiment, the flange portion 22 of the rotor support member 2 includes a protruding connecting portion 22b protruding to the first side L1 in the axial direction from the flange portion 22. The first sprocket 61 is connected to the protruding connecting portion 22b so as to rotate integrally with the protruding connecting portion 22b. In the present embodiment, the protruding connecting portion 22b is disposed so as to protrude to the first side L1 in the axial direction from the end portion of the inner tubular portion 231 of the cylinder forming portion 23 on the first side L1 in the axial direction.

In the present embodiment, the first sprocket 61 is disposed on the first side L1 in the axial direction with respect to the flange portion 22 and adjacent to the flange portion 22. The movement of the first sprocket 61 to the first side L1 in the axial direction is restricted by a restricting member 7. In the present embodiment, the restricting member 7 is an annular member disposed coaxially with the first sprocket 61. In the present embodiment, the restricting member 7 is interposed between the first sprocket 61 and the second side wall portion 12 of the case 1 in the axial direction L.

In the illustrated example, a plurality of splines extending in the axial direction L is provided on each of the inner peripheral portion of the first sprocket 61 and the outer peripheral portion of the protruding connecting portion 22b so as to be distributed in the circumferential direction. When the splines are engaged with each other, the first sprocket 61 is supported so as to be slidable in the axial direction L with its relative rotation with respect to the protruding connecting portion 22b being restricted. Thus, in the illustrated example, the movement of the first sprocket 61 in the axial direction L is restricted as the first sprocket 61 is sandwiched between the restricting member 7 and the flange portion 22 in the axial direction L.

As shown in FIG. 3, in the present embodiment, the vehicle drive device 100 includes a first bearing B1 and a second bearing B2 that rotatably support the rotor support member 2. In the present embodiment, the vehicle drive device 100 further includes a third bearing B3 that rotatably supports the input member I. In the present embodiment, each of the first bearing B1, the second bearing B2, and the third bearing B3 is a ball bearing.

The second bearing B2 rotatably supports the tubular portion 21 of the rotor support member 2. In the present embodiment, the second bearing B2 is disposed on the second side L2 in the axial direction with respect to the rotor Ro. In the present embodiment, the second bearing B2 is disposed on the outer side R2 in the radial direction with respect to the second tubular support portion 441 of the second inner support member 44. Further, in the present embodiment, the second bearing B2 is disposed on the outer peripheral surface of the tubular portion 21. Specifically, the tubular portion 21 includes a bearing support portion 211 that protrudes to the second side L2 in the axial direction with respect to the rotor Ro. The second bearing B2 is attached such that the inner peripheral surface of the second bearing B2 contacts the outer peripheral surface of the bearing support portion 211. Further, in the present embodiment, the second bearing B2 is supported by a bearing support portion 11a of the first side wall portion 11 of the case 1 (see FIG. 2). The bearing support portion 11a protrudes to the first side L1 in the axial direction and supports the second bearing B2 from the outer side R2 in the radial direction. In this way, the second bearing B2 supports the tubular portion 21 such that the tubular portion 21 is rotatable with respect to the first side wall portion 11. The rotor support member 2 is supported by the second bearing B2 from the outer side R2 in the radial direction.

In the present embodiment, the second bearing B2 is disposed so as to overlap with the second piston portion 42 as seen in the radial direction along the radial direction R. Specifically, the second bearing B2 is disposed so as to overlap with the second pressing portion 422 of the second piston portion 42 as seen in the radial direction. Further, in the present embodiment, the second bearing B2 is disposed so as to overlap with the rotor Ro as seen in the axial direction along the axial direction L. Further, in the present embodiment, the second bearing B2 is disposed so as to overlap with the coil end portion Ce of the stator St as seen in the radial direction along the radial direction R (see FIG. 2).

In the present embodiment, the tubular portion 21 is provided with a protrusion 21a protruding to the outer side R2 in the radial direction from the outer peripheral surface of the tubular portion 21, on the second side L2 in the axial direction with respect to the rotor Ro. Here, the protrusion 21a is continuously provided over the entire area in the circumferential direction. The protrusion 21a is disposed so as to be sandwiched between the rotor Ro and the second bearing B2 from both sides in the axial direction L. Specifically, the rotor Ro is disposed so as to contact the protrusion 21a from the first side L1 in the axial direction. Further, the second bearing B2 is disposed so as to contact the protrusion 21a from the second side L2 in the axial direction.

The first bearing B1 rotatably supports the flange portion 22 of the rotor support member 2. In the present embodiment, the first bearing B1 is disposed so as to overlap with the first piston portion 52 as seen in the radial direction along the radial direction R. Further, in the present embodiment, the first bearing B1 is disposed on the inner side R1 in the radial direction with respect to the cylinder forming portion 23 of the flange portion 22 at a position overlapping with the cylinder forming portion 23 as seen in the radial direction along the radial direction R. The first bearing B1 supports the rotor support member 2 from the inner side R1 in the radial direction. In the illustrated example, the first bearing B1 is interposed between the inner tubular portion 231 of the rotor support member 2 and the tubular protruding portion 13 (specifically, the outer protruding portion 132) of the case 1.

In the present embodiment, the third bearing B3 is disposed on the inner side R1 in the radial direction with respect to at least part of the second piston portion 42 at a position overlapping with the second piston portion 42 as seen in the radial direction along the radial direction R. Here, the third bearing B3 is disposed on the inner side R1 in the radial direction with respect to the second pressing portion 422 of the second piston portion 42. Further, the third bearing B3 is disposed so as to overlap with the second pressing portion 422 as seen in the radial direction. Further, in the present embodiment, the third bearing B3 is disposed on the second side L2 in the axial direction with respect to the oil chamber forming member 46. Further, the third bearing B3 is disposed on the inner side R1 in the radial direction with respect to part of the oil chamber forming member 46.

In the present embodiment, the third bearing B3 is disposed on the outer peripheral surface of the input tubular portion Ia in the input member I. Specifically, the third bearing B3 is attached such that the inner peripheral surface of the third bearing B3 contacts the outer peripheral surface of the input tubular portion Ia. Further, the third bearing B3 is supported by the first side wall portion 11 of the case 1 from the outer side R2 in the radial direction. In this way, the third bearing B3 supports the input member I such that the input member I is rotatable with respect to the first side wall portion 11.

In the present embodiment, an inner race of the third bearing B3 is in contact with a stepped portion provided on the outer peripheral surface of the input tubular portion Ia from the second side L2 in the axial direction. The outer race of the third bearing B3 is in contact with the first side wall portion 11 from the first side L1 in the axial direction. In this way, the movement of the third bearing B3 in the axial direction L is restricted by the input tubular portion Ia and the first side wall portion 11. As a result, the third bearing B3 can support the thrust load acting on the input member I supported by the third bearing B3.

As shown in FIG. 3, in the present embodiment, the vehicle drive device 100 includes an oil passage for supplying oil to the second hydraulic oil chamber 43 to cause the second piston portion 42 to operate. This oil passage includes a first hydraulic oil passage P11, a first hydraulic connection oil passage P12, and a second in-shaft oil passage P13.

The first hydraulic oil passage P11 is an oil passage that communicates with the second hydraulic oil chamber 43. The first hydraulic oil passage P11 is provided to extend from the inner peripheral surface to the outer peripheral surface of the input tubular portion Ia in the input member I.

The first hydraulic connection oil passage P12 is an oil passage that connects the first hydraulic oil passage P11 and the second in-shaft oil passage P13. The first hydraulic connection oil passage P12 is provided in the insertion portion Ma of the transmission input shaft M. In the present embodiment, the first hydraulic connection oil passage P12 is provided to extend along the radial direction R from the second in-shaft oil passage P13 inside the insertion portion Ma to the outer peripheral surface.

The second in-shaft oil passage P13 is an oil passage provided inside the transmission input shaft M. In the present embodiment, the second in-shaft oil passage P13 is provided to extend along the axial direction L.

In the present embodiment, the vehicle drive device 100 includes an oil passage for supplying oil to the first hydraulic oil chamber 53 to cause the first piston portion 52 to operate. This oil passage includes a second hydraulic oil passage P21, a second hydraulic connection oil passage P22, and a second radial oil passage P23.

The second hydraulic oil passage P21 is an oil passage that connects the inner side R1 of the rotor support member 2 in the radial direction and the first hydraulic oil chamber 53. In the present embodiment, the second hydraulic oil passage P21 is provided in the inner tubular portion 231 of the cylinder forming portion 23. The second hydraulic oil passage P21 is provided to extend from the inner peripheral surface to the outer peripheral surface of the inner tubular portion 231.

The second hydraulic connection oil passage P22 is an oil passage that connects the second radial oil passage P23 and the second hydraulic oil passage P21. The second hydraulic connection oil passage P22 is provided in the tubular protruding portion 13 of the case 1. In the present embodiment, the second hydraulic connection oil passage P22 includes: an axial groove P22a provided to extend along the axial direction L at the contact portion between the outer peripheral surface of the inner protruding portion 131 and the inner peripheral surface of the outer protruding portion 132; a circumferential groove P22b provided to extend along the circumferential direction in the outer peripheral surface of the outer protruding portion 132; and a connection hole P22c provided to extend along the radial direction R so as to connect the axial groove P22a and the circumferential groove P22b.

The second radial oil passage P23 is an oil passage provided in the second side wall portion 12 of the case 1. The second radial oil passage P23 is provided to extend along the radial direction R.

As shown in FIG. 4, in the present embodiment, the vehicle drive device 100 includes an oil passage for supplying oil to the second friction member 41 to lubricate the second friction member 41. This oil passage includes a first lubricating oil passage P31, a lubricating connection oil passage P32, and a first in-shaft oil passage P33. Oil supplied to the second friction member 41 in this way also has a function of cooling the second friction member 41.

The first lubricating oil passage P31 is an oil passage that supplies oil for lubricating the second friction member 41 to a second communication hole 44a of the second inner support member 44. The first lubricating oil passage P31 is provided to extend from the inner peripheral surface to the outer peripheral surface of the input tubular portion Ia in the input member I. In the present embodiment, the first lubricating oil passage P31 communicates with the space between the second piston portion 42 and the second inner support member 44. The second communication hole 44a is provided to pass through the second inner support member 44 in the radial direction R. In the present embodiment, the second communication hole 44a is provided to pass through the second tubular support portion 441 of the second inner support member 44 in the radial direction R.

The lubricating connection oil passage P32 is an oil passage that connects the first lubricating oil passage P31 and the first in-shaft oil passage P33. The lubricating connection oil passage P32 is provided in the insertion portion Ma of the transmission input shaft M. In the present embodiment, the lubricating connection oil passage P32 is provided to extend along the radial direction R from the first in-shaft oil passage P33 inside the insertion portion Ma to the outer peripheral surface.

The first in-shaft oil passage P33 is an oil passage provided inside the transmission input shaft M. In the present embodiment, the first in-shaft oil passage P33 is provided to extend along the axial direction L. In the present embodiment, the first in-shaft oil passage P33 is provided independently of the second in-shaft oil passage P13.

In the present embodiment, oil flowing through the first in-shaft oil passage P33, the lubricating connection oil passage P32, and the first lubricating oil passage P31 in this order flows into the space between the second piston portion 42 and the second inner support member 44. The oil that has flowed into this space branches to the space between the second inner support member 44 and the oil passage forming member 45 and the space between the second piston portion 42 and the oil passage forming member 45 (second cancel oil chamber 47), and flows toward the outer side R2 in the radial direction. Here, the second cancel oil chamber 47, which is the space between the second piston portion 42 and the oil passage forming member 45, is a closed space except a portion communicating with the first lubricating oil passage P31. Therefore, after the second cancel oil chamber 47 is filled with oil, oil from the first lubricating oil passage P31 mainly flows into the space between the second inner support member 44 and the oil passage forming member 45. Then, the oil that has flowed into the space between the second inner support member 44 and the oil passage forming member 45 flows through the radial groove 45a and then the second communication hole 44a to reach the second friction member 41. In the present embodiment, such an oil flow path to the second communication hole 44a functions as a first supply portion S1 that supplies oil to the second friction member 41 from the inner side R1 in the radial direction.

In the present embodiment, the vehicle drive device 100 includes an oil passage for supplying oil to the first friction member 51 to lubricate the first friction member 51. This oil passage includes a second lubricating oil passage P41 and a first radial oil passage P42. Oil supplied to the first friction member 51 in this way also has a function of cooling the first friction member 51.

The second lubricating oil passage P41 is an oil passage that supplies oil for lubricating the first friction member 51 to a first communication hole 54a of the first inner support member 54. The first communication hole 54a is provided to pass through the first inner support member 54 in the radial direction R. In the present embodiment, the first communication hole 54a is provided to pass through the first tubular support portion 541 of the first inner support member 54 in the radial direction R.

The second lubricating oil passage P41 is provided in the tubular protruding portion 13 of the case 1. In the present embodiment, the second lubricating oil passage P41 includes: an axial groove P41a provided to extend along the axial direction L at the contact portion between the outer peripheral surface of the inner protruding portion 131 and the inner peripheral surface of the outer protruding portion 132; a tubular oil passage P41b provided so as to be surrounded by the inner peripheral surface of the outer protruding portion 132 on the second side L2 in the axial direction with respect to the end portion of the inner protruding portion 131 on the second side L2 in the axial direction; and a connection hole P41c provided to extend along the radial direction R so as to connect the tubular oil passage P41b and the outer peripheral surface of the outer protruding portion 132.

The first radial oil passage P42 is an oil passage provided in the second side wall portion 12 of the case 1. The first radial oil passage P42 is provided to extend along the radial direction R. In the present embodiment, the first radial oil passage P42 is provided independently of the second radial oil passage P23.

In the present embodiment, oil flowing through the first radial oil passage P42 and the second lubricating oil passage P41 in this order flows into the space between the flange portion 22 and the first inner support member 54 through the connection hole P41c and an opening of the end portion of the tubular oil passage P41b on the second side L2 in the axial direction.

Then, of the oil flowing in this way, oil flowing from the connection hole P41c flows through a first through hole 24a and a second through hole 231a in this order to reach the first cancel oil chamber 58. The first through hole 24a is provided to pass through a fitting member 24 in the radial direction R.

The fitting member 24 is a member fitted to the inner peripheral surface of the inner tubular portion 231 of the cylinder forming portion 23 so as to contact the first bearing B1 from the second side L2 in the axial direction. The second through hole 231a is provided to pass through the inner tubular portion 231 of the cylinder forming portion 23 in the radial direction R. An opening portion of the second through hole 231a on the outer side R2 in the radial direction is open to the first cancel oil chamber 58. Here, the first cancel oil chamber 58 is a closed space except a portion communicating with the second through hole 231a. Therefore, after the first cancel oil chamber 58 is filled with oil, oil from the second lubricating oil passage P41 mainly flows out from the opening of the end portion of the tubular oil passage P41b on the second side L2 in the axial direction.

In this way, the oil flowing out from the opening of the end portion of the tubular oil passage P41b on the second side L2 in the axial direction flows between the fitting member 24 and the first radially extending portion 542 of the first inner support member 54 and further flows through the first communication hole 54a to reach the first friction member 51. In the present embodiment, such an oil flow path to the first communication hole 54a functions as a second supply portion S2 that supplies oil to the first friction member 51 from the inner side R1 in the radial direction.

Other Embodiments (1) In the above embodiment, the configuration has been described as an example, in which the first hydraulic oil chamber 53 is disposed so as to overlap with the first friction member 51 as seen in the axial direction along the axial direction L. However, the present disclosure is not limited to such a configuration. A configuration may be adopted in which the first hydraulic oil chamber 53 does not overlap with the first friction member 51 as seen in the axial direction. For example, the first hydraulic oil chamber 53 may be disposed on the inner side R1 in the radial direction with respect to the first friction member 51. In this case, the first hydraulic oil chamber 53 may be disposed so as to overlap with the first friction member 51 as seen in the radial direction along the radial direction R.

(2) In the above embodiment, the configuration has been described as an example, in which the first bearing B1 is disposed on the inner side R1 in the radial direction with respect to the cylinder forming portion 23 at a position overlapping with the cylinder forming portion 23 as seen in the radial direction along the radial direction R, and supports the rotor support member 2 from the inner side R1 in the radial direction. However, the present disclosure is not limited to such a configuration. For example, the first bearing B1 may be disposed on the outer side R2 in the radial direction with respect to the cylinder forming portion 23. Moreover, the first bearing B1 may be disposed so as not to overlap with the cylinder forming portion 23 as seen in the radial direction. Furthermore, a configuration may be adopted in which the first bearing B1 supports the rotor support member 2 from the outer side R2 in the radial direction.

(3) In the above embodiment, the configuration has been described as an example that includes the first supply portion S1 that supplies oil to the second friction member 41 from the inner side R1 in the radial direction. However, the present disclosure is not limited to such a configuration. A configuration may be adopted in which oil is supplied to the second friction member 41 from a direction other than the inner side R1 in the radial direction. Further, a configuration may be adopted that does not include the first supply portion S1.

(4) In the above embodiment, the configuration has been described as an example that includes the second supply portion S2 that supplies oil to the first friction member 51 from the inner side R1 in the radial direction. However, the present disclosure is not limited to such a configuration. A configuration may be adopted in which oil is supplied to the first friction member 51 from a direction other than the inner side R1 in the radial direction. Further, a configuration may be adopted that does not include the second supply portion S2.

(5) In the above embodiment, the configuration has been described as an example, in which the contact surface of the second inner support member 44 of the oil passage forming member 45 with respect to the second radially extending portion 442 is provided with the radial groove 45a extending along the radial direction R. However, the present disclosure is not limited to such a configuration. For example, a configuration may be adopted in which the radial groove 45a is not provided and the oil passage forming member 45 is spaced apart from the second radially extending portion 442 in the axial direction L.

(6) In the above embodiment, the configuration has been described as an example that includes the first hydraulic oil passage P11, the first hydraulic connection oil passage P12, and the second in-shaft oil passage P13 as the oil passage for supplying oil to the second hydraulic oil chamber 43 to cause the second piston portion 42 to operate. Also, the configuration has been described as an example that includes the second hydraulic oil passage P21, the second hydraulic connection oil passage P22, and the second radial oil passage P23 as the oil passage for supplying oil to the first hydraulic oil chamber 53 to cause the first piston portion 52 to operate. Also, the configuration has been described as an example that includes the first lubricating oil passage P31, the lubricating connection oil passage P32, and the first in-shaft oil passage P33 as the oil passage for supplying oil to the second friction member 41 to lubricate the second friction member 41. Also, the configuration has been described as an example that includes the second lubricating oil passage P41 and the first radial oil passage P42 as the oil passage for supplying oil to the first friction member 51 to lubricate the first friction member 51. However, these configurations of the oil passages are merely examples. A configuration may be adopted in which oil is supplied to various parts through oil passages with positions and shapes other than those described above.

(7) In the above embodiment, the configuration has been described as an example, in which each of the first bearing B1, the second bearing B2, and the third bearing B3 is a ball bearing. However, the present disclosure is not limited to such a configuration. For example, at least one of the first bearing B1, the second bearing B2, and the third bearing B3 may be a bearing of another type such as a roller bearing or a sliding bearing.

(8) In the above embodiment, the configuration has been described as an example, in which the second bearing B2 is disposed on the outer peripheral surface of the tubular portion 21. However, the present disclosure is not limited to such a configuration. The second bearing B2 may be disposed on the inner peripheral surface of the tubular portion 21. In this case, the second bearing B2 is attached such that the outer peripheral surface of the second bearing B2 contacts the inner peripheral surface of the tubular portion 21. The rotor support member 2 is supported by the second bearing B2 from the inner side R1 in the radial direction.

(9) In the above embodiment, the configuration has been described as an example, in which the second piston portion 42 is disposed so as to contact the outer peripheral surface of the input member I. However, the present disclosure is not limited to such a configuration. The second piston portion 42 may be disposed so as to contact another member provided on the outer peripheral surface of the input member I.

(10) In the above embodiment, the configuration has been described as an example, in which the flange portion 22 of the rotor support member 2 is provided with the adjusting recess 22a for adjusting the position of the center of gravity of the rotor Ro. However, the present disclosure is not limited to such a configuration. For example, the adjusting recess 22a may be provided in a portion of the rotor support member 2 other than the flange portion 22. Alternatively, the adjusting recess 22a does not have to be provided.

(11) In the above embodiment, the configuration has been described as an example, in which the first sprocket 61 serving as a pump driving member is disposed on the first side L1 in the axial direction with respect to the flange portion 22 and adjacent to the flange portion 22, and the movement of the first sprocket 61 to the first side L1 in the axial direction is restricted by the restricting member 7. However, the present disclosure is not limited to such a configuration. For example, the pump driving member may be a member other than the sprocket such as a pump shaft connected to a pump rotor. Moreover, the arrangement of the pump driving member is not limited to the above-mentioned position, and may be another position such as a position between the second inner support member 44 and the first inner support member 54 in the axial direction L. Furthermore, the restricting member 7 does not have to be provided.

(12) In the above embodiment, the configuration has been described as an example, in which the second bearing B2 contacts the protrusion 21a from the second side L2 in the axial direction and the rotor Ro contacts the protrusion 21a from the first side L1 in the axial direction. However, the present disclosure is not limited to such a configuration. A configuration may be adopted in which only one of the rotor Ro and the second bearing B2 contacts the protrusion 21a in the axial direction L. Alternatively, the protrusion 21a does not have to be provided on the outer peripheral surface of the tubular portion 21.

(13) In the above embodiment, the configuration has been described as an example, in which the joint portion 2a between the tubular portion 21 and the flange portion 22 is disposed on the outer side R2 in the radial direction with respect to the inner peripheral surface of the tubular portion 21. However, the present disclosure is not limited to such a configuration. The joint portion 2a between the tubular portion 21 and the flange portion 22 may be disposed on the inner side R1 in the radial direction with respect to the inner peripheral surface of the tubular portion 21.

(14) In the above embodiment, the outer support member 55 that supports the first friction member 51 from the outer side R2 in the radial direction is disposed on the inner side R1 in the radial direction with respect to the tubular portion 21 and is connected to the tubular portion 21 so as to integrally rotate with the tubular portion 21. However, the present disclosure is not limited to such a configuration. For example, a configuration may be adopted in which the outer support member 55 is not provided and the first friction member 51 is directly supported by the tubular portion 21 from the outer side R2 in the radial direction.

(15) In the above embodiment, the end portion of the contact member 56 on the inner side R1 in the radial direction is disposed on the inner side R1 in the radial direction with respect to the end portion of the first friction member 51 (first inner friction materials 511) on the inner side R1 in the radial direction. However, the present disclosure is not limited to such a configuration. The end portion of the contact member 56 on the inner side R1 in the radial direction may be disposed on the outer side R2 in the radial direction with respect to the end portion of the first friction member 51 (first inner friction materials 511) on the inner side R1 in the radial direction.

(16) In the above embodiment, the configuration has been described as an example, in which the dimension of the inner portion 561 of the contact member 56 in the axial direction L is smaller than the dimension of the outer portion 562 of the contact member 56 in the axial direction L. However, the present disclosure is not limited to such a configuration. For example, the inner portion 561 and the outer portion 562 may have the same dimension in the axial direction L. Alternatively, a configuration may be adopted in which the dimension of the inner portion 561 of the contact member 56 in the axial direction L is larger than the dimension of the outer portion 562 of the contact member 56 in the axial direction L.

(17) In the above embodiment, the configuration has been described as an example, in which the first engagement device CL1 is disposed in the power transmission path between the rotary electric machine MG and the transmission TM, and the second engagement device CL2 is disposed in the power transmission path between the input member I and the rotary electric machine MG. However, the respective arrangement positions of the first engagement device CL1 and the second engagement device CL2 in the power transmission paths are not particularly limited.

(18) The configurations disclosed in the above embodiments can be applied in combination with the configurations disclosed in other embodiments as long as there is no contradiction. Regarding the other configurations, the embodiments disclosed herein are merely exemplary in all respects. Therefore, various modifications can be made as appropriate without departing from the scope of the present disclosure.

Outline of Embodiments Described Above

Hereinafter, the outline of the vehicle drive device (100) described above will be described.

A vehicle drive device (100) includes:
an input member (I) that is drivingly connected to an internal combustion engine (EG);
a rotary electric machine (MG) including a stator (St) and a rotor (Ro) that is disposed on an inner side (R1) in a radial direction (R) with respect to the stator (St), and functioning as a driving force source for wheels (W);
a transmission (TM) that changes a speed of rotation transmitted from the rotary electric machine (MG) side;
a rotor support member (2) that supports the rotor (Ro);
a rotation sensor (3) that detects rotation of the rotor (Ro); and
a first engagement device (CL1) disposed on the inner side (R1) in the radial direction (R) with respect to the rotor (Ro),
the first engagement device (CL1) being disposed in a power transmission path between the rotary electric machine (MG) and the transmission (TM), in which:
the first engagement device (CL1) includes a first friction member (51) and a first piston portion (52) that presses the first friction member (51) in an axial direction (L);
when in the axial direction (L), one side in the axial direction (L) with respect to the first engagement device (CL1) is defined as a first side (L1) in the axial direction, and a side opposite to the first side (L1) in the axial direction is defined as a second side (L2) in the axial direction,
the rotor support member (2) includes a tubular portion (21) having a tubular shape extending along the axial direction (L) and supporting the rotor (Ro), and a flange portion (22) provided to extend along the radial direction (R) on the inner side (R1) in the radial direction (R) with respect to the tubular portion (21) at a position adjacent to the first engagement device (CL1) on the first side (L1) in the axial direction that is the one side in the axial direction (L), and connected to the tubular portion (21);
the flange portion (22) includes a cylinder forming portion (23) protruding to the first side (L1) in the axial direction so as to form a cylinder portion (C1) on which the first piston portion (52) slides; and
the rotation sensor (3) includes a rotating body (31) supported by an outer peripheral surface of the cylinder forming portion (23) on an outer side (R2) in the radial direction (R), and a fixed body (32) disposed on the outer side (R2) in the radial direction (R) with respect to the rotating body (31).

According to this configuration, the flange portion (22) of the rotor support member (2) includes the cylinder forming portion (23) protruding to the one side (L1) in the axial direction so as to form the cylinder portion (C1) on which the first piston portion (52) of the first engagement device (CL1) slides. The rotating body (31) of the rotation sensor (3) is supported by the outer peripheral surface of the cylinder forming portion (23). Therefore, it is not necessary to separately provide a member for supporting the rotating body (31). This can reduce the manufacturing cost of the vehicle drive device (100).

Further, according to this configuration, the rotating body (31) of the rotation sensor (3) is supported by the outer peripheral surface of the cylinder forming portion (23), and the fixed body (32) of the rotation sensor (3) is disposed on the outer side (R2) in the radial direction (R) with respect to the rotating body (31). With this, the rotation sensor (3) can be disposed using the space overlapping with the cylinder forming portion (23) as seen in the radial direction. Further, it is not necessary to provide a clearance in the radial direction (R) between the rotation sensor (3) and the cylinder forming portion (23). Thus, it is possible to suppress an increase in dimensions of the vehicle drive device (100) in the axial direction (L) and the radial direction (R).

Here, it is preferable that a first bearing (B1) be further provided that rotatably supports the flange portion (22), in which:
the first engagement device (CL1) includes a first hydraulic oil chamber (53) to which oil for operating the first piston portion (52) is supplied; and
the first hydraulic oil chamber (53) is provided between the cylinder forming portion (23) and the first piston portion (52).

According to this configuration, the flange portion (22) has a function of rotatably supporting the rotor (Ro) via the tubular portion (21), a function of forming the first hydraulic oil chamber (53), and a function of supporting the rotation sensor (3) via the cylinder forming portion (23). Thus, it is possible to reduce the size and the manufacturing cost of the vehicle drive device (100), as compared with the configuration in which members having these functions are separately provided.

In the configuration including the first bearing (B1) and in which the first engagement device (CL1) includes the first hydraulic oil chamber (53), it is preferable that the first friction member (51) be disposed so as to overlap with the first hydraulic oil chamber (53) as seen in an axial direction along the axial direction (L).

According to this configuration, the first friction member (51) and the first hydraulic oil chamber (53) are arranged side by side in the axial direction (L). Therefore, the first friction member (51) and the first hydraulic oil chamber (53) are less likely to interfere with each other in the radial direction (R). This makes it easier to secure a large dimension of the first friction member (51) in the radial direction (R). That is, it becomes easier to secure a large heat capacity while suppressing an increase in dimension of the first engagement device (CL1) in the radial direction (R).

Further, it is preferable that the first bearing (B1) be disposed on the inner side (R1) in the radial direction (R) with respect to the cylinder forming portion (23) so as to overlap with the cylinder forming portion (23) as seen in a radial direction along the radial direction (R), and support the rotor support member (2) from the inner side (R1) in the radial direction (R).

With this configuration, the first bearing (B1) can be disposed using the space overlapping with the cylinder forming portion (23) as seen in the radial direction. Thus, it is possible to suppress an increase in dimension of the vehicle drive device (100) in the axial direction (L) due to the placement of the first bearing (B1).

Further, it is preferable that a second engagement device (CL2) be further provided that is disposed side by side with the first engagement device (CL1) in the axial direction (L), on the inner side (R1) in the radial direction (R) with respect to the tubular portion (21), in which the second engagement device (CL2) is disposed in a power transmission path between the input member (I) and the rotary electric machine (MG).

With this configuration, by switching the engagement states of the first engagement device (CL1) and the second engagement device (CL2), it is possible to perform switching among: a state in which only the rotary electric machine (MG), of the rotary electric machine (MG) and the internal combustion engine (EG), is connected to the transmission (TM); a state in which both the rotary electric machine (MG) and the internal combustion engine (EG) are connected to the transmission (TM); and a state in which the rotary electric machine (MG) and the internal combustion engine (EG) are connected to each other and disconnected from the transmission (TM).

In the configuration further including the second engagement device (CL2), it is preferable that the first engagement device (CL1) and the second engagement device (CL2) be disposed so as to overlap with the rotor (Ro) as seen in a radial direction along the radial direction (R).

With this configuration, the first engagement device (CL1) and the second engagement device (CL2) can be disposed using the space overlapping with the rotor (Ro) as seen in the radial direction (R). Thus, it is possible to suppress an increase in dimension of the vehicle drive device (100) in the axial direction (L) due to the placement of the first engagement device (CL1) and the second engagement device (CL2).

It is preferable that a second bearing (B2) be further provided that rotatably supports the tubular portion (21), in which:

the second engagement device (CL2) includes a second friction member (41) and a second piston portion (42) that presses the second friction member (41) in the axial direction (L);

the second bearing (B2) is disposed on an outer peripheral surface of the tubular portion (21) on the second side (L2) in the axial direction with respect to the rotor (Ro); and the second piston portion (42) is disposed so as to contact an outer peripheral surface of the input member (I).

According this configuration, the second bearing (B2) is disposed on the outer peripheral surface of the tubular portion (21) on the second side (L2) in the axial direction with respect to the rotor (Ro). Therefore, it is easy to secure a space for disposing the second piston portion (42) on the inner side (R1) in the radial direction (R) with respect to the tubular portion (21). Thus, it is possible to suppress an increase in dimensions of the vehicle drive device (100) in the axial direction (L) and the radial direction (R) due to the placement of the second piston portion (42).

Further, according to this configuration, the second piston portion (42) is disposed on the outer peripheral surface of the input member (I) without other members interposed therebetween. This makes it possible to simplify the configuration of the second engagement device (CL2).

Further, it is preferable that the tubular portion (21) support the second friction member (41) of the second engagement device (CL2) from the outer side (R2) in the radial direction (R).

With this configuration, it is not necessary to separately provide a member for supporting the second friction member (41) from the outer side (R2) in the radial direction (R). Thus, it is possible to reduce the size and the manufacturing cost of the vehicle drive device (100).

It is preferable that a first supply portion (S1) be further provided that supplies oil to the second friction member (41) of the second engagement device (CL2) from the inner side (R1) in the radial direction (R).

With this configuration, it is possible to appropriately supply oil to the second friction member (41) from the inner side (R1) in the radial direction (R) using centrifugal force of a rotating member such as the rotor support member (2) provided in the vehicle drive device (100). This makes it possible to appropriately cool the second friction member (41). As a result, it is possible to reduce the heat capacity required for the second friction member (41). This facilitates reduction in size of the second friction member (41), and therefore, reduction in size of the vehicle drive device (100).

In the configuration including the first supply portion (S1), it is preferable that a second inner support member (44) that supports the second friction member (41) from the inner side (R1) in the radial direction (R), and an oil passage forming member (45) disposed so as to contact the second inner support member (44) be further provided, in which:

the second inner support member (44) includes a tubular support portion (441) having a tubular shape extending along the axial direction (L) and supporting the second friction member (41), and a radially extending support portion (442) that is provided to extend to the inner side (R1) in the radial direction (R) from the tubular support portion (441) and contacts the oil passage forming member (45) in the axial direction (L); and a contact surface of the oil passage forming member (45) with respect to the radially extending support portion (442) is provided with a radial groove (45a) extending along the radial direction (R).

With this configuration, it is possible to form an oil passage in which oil flows along the radial direction (R) between the oil passage forming member (45) and the radially extending support portion (442), without separating the oil passage forming member (45) and the radially extending support portion (442) in the axial direction (L). Thus, it is possible to appropriately supply oil to the second friction member (41) from the inner side (R1) in the radial direction (R) while suppressing an increase in dimension of the vehicle drive device (100) in the axial direction (L).

It is preferable that a second inner support member (44) be further provided that supports the second friction member (41) of the second engagement device (CL2) from the inner side (R1) in the radial direction (R), in which:

the input member (I) includes an input tubular portion (Ia) having a tubular shape in which an end surface on one side (L2) in the axial direction (L) is open;

a transmission input shaft (M) that is an input element of the transmission (TM) includes an insertion portion (Ma) inserted to the inner side (R1) of the input tubular portion (Ia) in the radial direction (R);

the second inner support member (44) is provided with a second communication hole (44a) that passes through the second inner support member (44) in the radial direction (R);

the input tubular portion (Ia) is provided with a first lubricating oil passage (P31) that supplies oil for lubricating the second friction member (41) to the second communication hole (44a), the first lubricating oil passage (P31) extending from an inner peripheral surface to an outer peripheral surface of the input tubular portion (Ia); and the insertion portion (Ma) is provided with a lubricating connection oil passage (P32) that connects a first in-shaft oil passage (P33) provided inside the transmission input shaft (M) and the first lubricating oil passage (P31).

According to this configuration, oil flows through the first in-shaft oil passage (P33) of the transmission input shaft (M), the lubricating connection oil passage (P32) of the insertion portion (Ma), the first lubricating oil passage (P31) of the input tubular portion (Ia), and the second communication hole (44a) of the second inner support member (44) in this order, so that the oil can be appropriately supplied to the second friction member (41) that is supported by the second inner support member (44). Thus, the second friction member (41) can be appropriately lubricated.

It is preferable that the second engagement device (CL2) include a second friction member (41), a second piston portion (42) that presses the second friction member (41) in the axial direction (L), and a second hydraulic oil chamber (43) to which oil for operating the second piston portion (42) is supplied, the input member (I) include an input tubular portion (Ia) having a tubular shape in which an end surface on one side (L2) in the axial direction (L) is open, a transmission input shaft (M) that is an input element of the transmission (TM) include an insertion portion (Ma) inserted to the inner side (R1) of the input tubular portion (Ia) in the radial direction (R), the input tubular portion (Ia) be provided with a first hydraulic oil passage (P11) communicating with the second hydraulic oil chamber (43), the first hydraulic oil passage (P11) extending from an inner peripheral surface to an outer peripheral surface of the input tubular portion (Ia), and the insertion portion (Ma) be provided with a first hydraulic connection oil passage (P12) that connects a second in-shaft oil passage (P13) provided inside the transmission input shaft (M) and the first hydraulic oil passage (P11).

According to this configuration, oil flows through the second in-shaft oil passage (P13) of the transmission input shaft (M), the first hydraulic connection oil passage (P12) of the insertion portion (Ma), and the first hydraulic oil passage (P11) of the input tubular portion (Ia) in this order, so that the oil can be appropriately supplied to the second hydraulic oil chamber (43) communicating with the first hydraulic oil passage (P11).

It is preferable that a second supply portion (S2) be further provided that supplies oil to the first friction member (51) from the inner side (R1) in the radial direction (R).

According to this configuration, it is possible to appropriately supply oil to the first friction member (51) from the inner side (R1) in the radial direction (R) using centrifugal force of a rotating member such as the rotor support member (2) provided in the vehicle drive device (100). This makes it possible to appropriately cool the first friction member (51). As a result, it is possible to reduce the heat capacity required for the first friction member (51). This facilitates reduction in size of the first friction member (51), and therefore, reduction in size of the vehicle drive device (100).

It is preferable that a case (1) for accommodating the rotary electric machine (MG), the rotor support member (2), the rotation sensor (3), and the first engagement device (CL1), and a first inner support member (54) that supports the first friction member (51) from the inner side (R1) in the radial direction (R) be further provided, in which:

the case (1) includes a radially extending portion (12) disposed on the first side (L1) in the axial direction with respect to the flange portion (22) and provided to extend along the radial direction (R), and a tubular protruding portion (13) having a tubular shape protruding in the axial direction (L) from the radially extending portion (12) and disposed so as to extend on the inner side (R1) in the radial direction (R) with respect to the cylinder forming portion (23);

the first inner support member (54) is provided with a first communication hole (54a) that passes through the first inner support member (54) in the radial direction (R); and the tubular protruding portion (13) is provided with a second lubricating oil passage (P41) that is connected to a first radial oil passage (P42) provided in the radially extending portion (12) and that supplies oil for lubricating the first friction member (51) to the first communication hole (54a).

According to this configuration, oil flows through the first radial oil passage (P42) of the radially extending portion (12), the second lubricating oil passage (P41) of the tubular protruding portion (13), and the first communication hole (54a) of the first inner support member (54) in this order, so that the oil can be appropriately supplied to the first friction member (51) that is supported by the first inner support member (54).

Thus, the first friction member (51) can be appropriately lubricated.

It is preferable that a case (1) for accommodating the rotary electric machine (MG), the rotor support member (2), the rotation sensor (3), and the first engagement device (CL1) be further provided, in which:
- the case (1) includes a radially extending portion (12) disposed on the first side (L1) in the axial direction with respect to the flange portion (22) and provided to extend along the radial direction (R), and a tubular protruding portion (13) having a tubular shape protruding in the axial direction (L) from the radially extending portion (12) and disposed so as to extend on the inner side (R1) in the radial direction (R) with respect to the cylinder forming portion (23);
- the first engagement device (CL1) includes a first hydraulic oil chamber (53) to which oil for operating the first piston portion (52) is supplied;
- the cylinder forming portion (23) is provided with a second hydraulic oil passage (P21) that connects the inner side (R1) of the cylinder forming portion (23) in the radial direction (R) with the first hydraulic oil chamber (53); and
- the tubular protruding portion (13) is provided with a second hydraulic connection oil passage (P22) that connects the second radial oil passage (P23) provided in the radially extending portion (12) and the second hydraulic oil passage (P21).

According to this configuration, oil flows through the second radial oil passage (P23) of the radially extending portion (12), the second hydraulic connection oil passage (P22) of the tubular protruding portion (13), and the second hydraulic oil passage (P21) of the cylinder forming portion (23) in this order, so that the oil can be appropriately supplied to the first hydraulic oil chamber (53) communicating with the second hydraulic oil passage (P21).

It is preferable that a second bearing (B2) that rotatably supports the tubular portion (21), and
- a third bearing (B3) that rotatably supports the input member (I) be further provided, in which:
- the second bearing (B2) is disposed on an outer peripheral surface of the tubular portion (21) on the second side (L2) in the axial direction with respect to the rotor (Ro); and
- the third bearing (B3) is a ball bearing.

According this configuration, the second bearing (B2) is disposed on the outer peripheral surface of the tubular portion (21) on the second side (L2) in the axial direction with respect to the rotor (Ro). Therefore, it is easy to secure a space for disposing the third bearing (B3) on the inner side (R1) in the radial direction (R) with respect to the tubular portion (21). This makes it easier to appropriately dispose the third bearing (B3) that is a ball bearing having a relatively large dimension in the radial direction (R).

Further, according to this configuration, the third bearing (B3) that is a ball bearing has a relatively large dimension in the radial direction (R). Therefore, when the third bearing (B3) is brought into contact with another member in the axial direction (L), the third bearing (B3) can receive the thrust load acting on the input member (I) supported by the third bearing (B3). Thus, it is possible to restrict the movement of the input member (I) in the axial direction (L) without separately providing a member for receiving the thrust load acting on the input member (I).

Further, it is preferable that the flange portion (22) be provided with an adjusting recess (22a) for adjusting a position of a center of gravity of the rotor (Ro).

With this configuration, it becomes easier to appropriately adjust the position of the center of gravity of the rotor (Ro) while keeping the influence on the strength of the rotor support member (2) small.

In the configuration in which the flange portion (22) is provided with the adjusting recess (22a), it is preferable that the adjusting recess (22a) be provided in a surface of the flange portion (22) that faces the first side (L1) in the axial direction.

According to this configuration, the adjusting recess (22a) is provided on the surface of the flange portion (22) that faces the side opposite to the first engagement device (CL1) side in the axial direction (L). This makes it easier to keep the influence of the adjusting recess (22a) on the configuration of the first engagement device (CL1) small.

It is preferable that a pump driving member (61) for driving a hydraulic pump be further provided, in which:
- the flange portion (22) includes a protruding connecting portion (22b) that protrudes to the first side (L1) in the axial direction from the flange portion (22); and
- the pump driving member (61) is connected to the protruding connecting portion (22b) so as to rotate integrally with the protruding connecting portion (22b).

With this configuration, the flange portion (22) of the rotor support member (2) can also serve as part of the pump driving mechanism (6) for driving the hydraulic pump. Thus, it is possible to reduce the size and the manufacturing cost of the vehicle drive device (100), as compared with the configuration in which a mechanism for driving the hydraulic pump is separately provided.

In the configuration including the pump driving member (61),
- it is preferable that the pump driving member (61) be disposed on the first side (L1) in the axial direction with respect to the flange portion (22) and adjacent to the flange portion (22), and movement of the pump driving member (61) to the first side (L1) in the axial direction be restricted by a restricting member (7).

According to this configuration, the movement of the pump driving member (61) to the second side (L2) in the axial direction is restricted by the flange portion (22), and the movement of the pump driving member (61) to the first side (L1) in the axial direction is restricted by the restricting member (7). This makes it easier to dispose the pump driving member (61) in an appropriate position.

It is preferable that a second bearing (B2) be further provided that rotatably supports the tubular portion (21), in which:
- the tubular portion (21) is provided with a protrusion (21a) that protrudes to the outer side (R2) in the radial direction (R) from an outer peripheral surface of the tubular portion (21) on the second side (L2) in the axial direction with respect to the rotor (Ro);
- the rotor (Ro) is in contact with the protrusion (21a) from the first side (L1) in the axial direction; and
- the second bearing (B2) is in contact with the protrusion (21a) from the second side (L2) in the axial direction.

According to this configuration, the movement of the rotor (Ro) to the second side (L2) in the axial direction is restricted by the protrusion (21a). The movement of the second bearing (B2) to the first side (L1) in the axial direction is restricted by the protrusion (21a). Thus, it is possible to easily position the rotor (Ro) and the second bearing (B2) in the axial direction (L) using the protrusion (21a).

It is preferable that the tubular portion (21) and the flange portion (22) that are separate members be joined to each other, and
 a joint portion (2a) between the tubular portion (21) and the flange portion (22) be disposed on the outer side (R2) in the radial direction (R) with respect to an inner peripheral surface of the tubular portion (21).

With this configuration, it becomes easier to suppress interference of the joint portion (2a) when machining the inner peripheral surface of the tubular portion (21). Therefore, machinability of the inner peripheral surface of the tubular portion (21) can be improved.

It is preferable that an outer support member (55) that supports the first friction member (51) from the outer side (R2) in the radial direction (R) be further provided, in which
 the outer support member (55) is disposed on the inner side (R1) in the radial direction (R) with respect to the tubular portion (21), and is connected to the tubular portion (21) so as to rotate integrally with the tubular portion (21).

According to this configuration, the first friction member (51) is supported by the outer support member (55) that is a member separate from the tubular portion (21). Therefore, in the manufacturing process of the vehicle drive device (100), it is possible to connect the outer support member (55) to the tubular portion (21) after the first friction member (51) is assembled to the outer support member (55). Thus, the assembly work of the first engagement device (CL1) can be easily performed.

It is preferable that a contact member (56) that contacts the first friction member (51) be further provided, in which:
 the contact member (56) is disposed so as to contact the first friction member (51) from a side opposite to the first piston portion (52) side in the axial direction (L); and
 an end portion of the contact member (56) on the inner side (R1) in the radial direction (R) is disposed on the inner side (R1) in the radial direction (R) with respect to an end portion of the first friction member (51) on the inner side (R1) in the radial direction (R).

According to this configuration, when oil is supplied to the first friction member (51), the contact member (56) can restrict the flow of the supplied oil to the side away from the first friction member (51) in the axial direction (L). Thus, oil supply to the first friction member (51) can be made more efficient.

In the configuration including the contact member (56), it is preferable that a dimension of an inner portion (561) of the contact member (56) in the axial direction (L) be smaller than a dimension of an outer portion (562) of the contact member (56) in the axial direction (L), the inner portion (561) being a predetermined radial area including an inner end portion of the contact member (56) in the radial direction (R), and the outer portion (562) being an area on the outer side (R2) in the radial direction (R) with respect to the inner portion (561).

With this configuration, even when the inner portion (561) of the contact member (56) is disposed at a position overlapping with the support member and the like of the first friction member (51) as seen in the axial direction, it is easy to suppress the contact member (56) from interfering with the support member and the like. Thus, it is possible to make the oil supply to the first friction member (51) more efficient while suppressing an increase in dimension of the vehicle drive device (100) in the axial direction (L).

INDUSTRIAL APPLICABILITY

The technology according to the present disclosure can be used in a vehicle drive device including a rotary electric machine including a stator and a rotor disposed on the inner side in the radial direction with respect to the stator and functioning as a driving force source for wheels, a rotor support member that supports the rotor, a rotation sensor that detects rotation of the rotor, and a first engagement device disposed on the inner side in the radial direction with respect to the rotor.

DESCRIPTION OF THE REFERENCE NUMERALS

100: vehicle drive device
2: rotor support member
21: tubular portion
22: flange portion
23: cylinder forming portion
3: rotation sensor
31: rotating body
32: fixed body
CL1: first engagement device
C1: first cylinder portion (cylinder portion)
51: first friction member
52: first piston portion
I: input member
MG: rotary electric machine
TM: transmission
St: stator
Ro: rotor
W: wheel
L: axial direction
L1: first side in axial direction
L2: second side in axial direction
R: radial direction
R1: inner side in radial direction
R2: outer side in radial direction

The invention claimed is:
1. A vehicle drive device comprising:
an input member drivingly connected to an internal combustion engine;
a rotary electric machine including a stator and a rotor that is disposed on an inner side in a radial direction with respect to the stator, and functioning as a driving force source for wheels;
a transmission that changes a speed of rotation transmitted from the rotary electric machine side;
a rotor support member that supports the rotor;
a rotation sensor that detects rotation of the rotor; and
a first engagement device disposed on the inner side in the radial direction with respect to the rotor,
the first engagement device being disposed in a power transmission path between the rotary electric machine and the transmission, wherein:
the first engagement device includes a first friction member and a first piston portion that presses the first friction member in an axial direction;
when in the axial direction, one side in the axial direction with respect to the first engagement device is defined as a first side in the axial direction, and a side opposite to the first side in the axial direction is defined as a second side in the axial direction,
the rotor support member includes a tubular portion having a tubular shape extending along the axial direction and supporting the rotor, and a flange portion provided to extend along the radial direction on the inner side in the radial direction with respect to the tubular portion at a position adjacent to the first engage- ment device on the first side in the axial direction, and connected to the tubular portion;

the flange portion includes a cylinder forming portion protruding to the first side in the axial direction so as to form a cylinder portion on which the first piston portion slides; and the rotation sensor includes a rotating body supported by an outer peripheral surface of the cylinder forming portion on an outer side in the radial direction, and a fixed body disposed on the outer side in the radial direction with respect to the rotating body.

2. The vehicle drive device according to claim 1, further comprising a first bearing that rotatably supports the flange portion, wherein:

the first engagement device includes a first hydraulic oil chamber to which oil for operating the first piston portion is supplied; and the first hydraulic oil chamber is provided between the cylinder forming portion and the first piston portion.

3. The vehicle drive device according to claim 2, wherein the first friction member is disposed so as to overlap with the first hydraulic oil chamber as seen in an axial direction along the axial direction.

4. The vehicle drive device according to claim 3, wherein the first bearing is disposed on the inner side in the radial direction with respect to the cylinder forming portion so as to overlap with the cylinder forming portion as seen in a radial direction along the radial direction, and supports the rotor support member from the inner side in the radial direction.

5. The vehicle drive device according to claim 2, wherein the first bearing is disposed on the inner side in the radial direction with respect to the cylinder forming portion so as to overlap with the cylinder forming portion as seen in a radial direction along the radial direction, and supports the rotor support member from the inner side in the radial direction.

6. The vehicle drive device according to claim 2, further comprising a second engagement device disposed side by side with the first engagement device in the axial direction, on the inner side in the radial direction with respect to the tubular portion, wherein the second engagement device is disposed in a power transmission path between the input member and the rotary electric machine.

7. The vehicle drive device according to claim 1, further comprising a second engagement device disposed side by side with the first engagement device in the axial direction, on the inner side in the radial direction with respect to the tubular portion, wherein the second engagement device is disposed in a power transmission path between the input member and the rotary electric machine.

8. The vehicle drive device according to claim 7, wherein the first engagement device and the second engagement device are disposed so as to overlap with the rotor as seen in a radial direction along the radial direction.

9. The vehicle drive device according to claim 7, further comprising a second bearing that rotatably supports the tubular portion, wherein:

the second engagement device includes a second friction member and a second piston portion that presses the second friction member in the axial direction;

the second bearing is disposed on an outer peripheral surface of the tubular portion on the second side in the axial direction with respect to the rotor; and the second piston portion is disposed so as to contact an outer peripheral surface of the input member.

10. The vehicle drive device according to claim 7, wherein the tubular portion supports the second friction member of the second engagement device from the outer side in the radial direction.

11. The vehicle drive device according to claim 1, further comprising a second supply portion that supplies oil to the first friction member from the inner side in the radial direction.

12. The vehicle drive device according to claim 1, further comprising:

a case for accommodating the rotary electric machine, the rotor support member, the rotation sensor, and the first engagement device; and a first inner support member that supports the first friction member from the inner side in the radial direction, wherein:

the case includes a radially extending portion disposed on the first side in the axial direction with respect to the flange portion and provided to extend along the radial direction, and a tubular protruding portion having a tubular shape protruding in the axial direction from the radially extending portion and disposed so as to extend on the inner side in the radial direction with respect to the cylinder forming portion;

the first inner support member is provided with a first communication hole that passes through the first inner support member in the radial direction; and the tubular protruding portion is provided with a second lubricating oil passage that is connected to a first radial oil passage provided in the radially extending portion and that supplies oil for lubricating the first friction member to the first communication hole.

13. The vehicle drive device according to claim 1, further comprising a case for accommodating the rotary electric machine, the rotor support member, the rotation sensor, and the first engagement device, wherein:

the case includes a radially extending portion disposed on the first side in the axial direction with respect to the flange portion and provided to extend along the radial direction, and a tubular protruding portion having a tubular shape protruding in the axial direction from the radially extending portion and disposed so as to extend on the inner side in the radial direction with respect to the cylinder forming portion;

the first engagement device includes a first hydraulic oil chamber to which oil for operating the first piston portion is supplied;

the cylinder forming portion is provided with a second hydraulic oil passage that connects the inner side of the cylinder forming portion in the radial direction with the first hydraulic oil chamber; and the tubular protruding portion is provided with a second hydraulic connection oil passage that connects a second radial oil passage provided in the radially extending portion and the second hydraulic oil passage.

14. The vehicle drive device according to claim 1, further comprising:

a second bearing that rotatably supports the tubular portion; and a third bearing that rotatably supports the input member, wherein:

the second bearing is disposed on an outer peripheral surface of the tubular portion on the second side in the axial direction with respect to the rotor; and the third bearing is a ball bearing.

15. The vehicle drive device according to claim 1, wherein the flange portion is provided with an adjusting recess for adjusting a position of a center of gravity of the rotor.

16. The vehicle drive device according to claim 1, further comprising a pump driving member that drives a hydraulic pump, wherein:
- the flange portion includes a protruding connecting portion that protrudes to the first side in the axial direction from the flange portion; and
- the pump driving member is connected to the protruding connecting portion so as to rotate integrally with the protruding connecting portion.

17. The vehicle drive device according to claim 1, further comprising a second bearing that rotatably supports the tubular portion, wherein:
- the tubular portion is provided with a protrusion that protrudes to the outer side in the radial direction from an outer peripheral surface of the tubular portion on the second side in the axial direction with respect to the rotor;
- the rotor is in contact with the protrusion from the first side in the axial direction; and
- the second bearing is in contact with the protrusion from the second side in the axial direction.

18. The vehicle drive device according to claim 1, wherein:
- the tubular portion and the flange portion that are separate members are joined to each other; and
- a joint portion between the tubular portion and the flange portion is disposed on the outer side in the radial direction with respect to an inner peripheral surface of the tubular portion.

19. The vehicle drive device according to claim 1, further comprising an outer support member that supports the first friction member from the outer side in the radial direction, wherein the outer support member is disposed on the inner side in the radial direction with respect to the tubular portion, and is connected to the tubular portion so as to rotate integrally with the tubular portion.

20. The vehicle drive device according to claim 1, further comprising a contact member that contacts the first friction member, wherein:
- the contact member is disposed so as to contact the first friction member from a side opposite to the first piston portion side in the axial direction; and
- an end portion of the contact member on the inner side in the radial direction is disposed on the inner side in the radial direction with respect to an end portion of the first friction member on the inner side in the radial direction.

* * * * *